United States Patent
Yip et al.

(10) Patent No.: US 10,863,235 B2
(45) Date of Patent: Dec. 8, 2020

(54) METHOD AND APPARATUS FOR TRANSMITTING AND REPRODUCING CONTENT IN VIRTUAL REALITY SYSTEM

(71) Applicant: Samsung Electronics Co., Ltd., Gyeonggi-do (KR)

(72) Inventors: Eric Yip, Seoul (KR); Byeong-Doo Choi, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 15/702,367

(22) Filed: Sep. 12, 2017

(65) Prior Publication Data

US 2018/0077451 A1 Mar. 15, 2018

(30) Foreign Application Priority Data

Sep. 12, 2016 (KR) ........................ 10-2016-0117072

(51) Int. Cl.
*H04N 21/44* (2011.01)
*H04N 13/178* (2018.01)
(Continued)

(52) U.S. Cl.
CPC ... *H04N 21/44008* (2013.01); *H04N 5/23238* (2013.01); *H04N 13/111* (2018.05);
(Continued)

(58) Field of Classification Search
None
See application file for complete search history.

(56) References Cited

U.S. PATENT DOCUMENTS

| 9,363,569 B1 | 6/2016 | van Hoff et al. |
| 2006/0284791 A1 | 12/2006 | Chen et al. |

(Continued)

FOREIGN PATENT DOCUMENTS

| EP | 2 824 833 | 1/2015 |
| WO | WO 2015/190650 | 12/2015 |

OTHER PUBLICATIONS

International Search Report dated Dec. 21, 2017 issued in counterpart application No. PCT/KR2017/009993, 9 pages.

(Continued)

*Primary Examiner* — Michael R Telan
(74) *Attorney, Agent, or Firm* — The Farrell Law Firm, P.C.

(57) ABSTRACT

Disclosed is a technology for a sensor network, Machine to Machine (M2M) communication, Machine Type Communication (MTC), and Internet of Things (IoT). The present disclosure can be used for intelligent services based on the technology (services related to smart home, smart building, smart city, smart car, connected car, health care, digital education, retail business, security, and safety). A method of reproducing content by a virtual reality device is provided. The method includes transmitting parameters related to functions of a user device; receiving interest metadata related to content that matches a set of the transmitted parameters; receiving and decoding the content corresponding to a version that matches the set of transmitted parameters in a unit of at least one tile corresponding to a view area to be displayed in accordance with a user's viewpoint based on the interest metadata; and rendering the decoded tile based on the interest metadata.

20 Claims, 19 Drawing Sheets

(51) Int. Cl.
    *H04N 13/194* (2018.01)
    *H04N 13/117* (2018.01)
    *H04N 13/111* (2018.01)
    *H04N 5/232* (2006.01)
    *H04N 21/41* (2011.01)
    *H04N 21/81* (2011.01)
    *H04N 13/344* (2018.01)
    *G06F 3/0482* (2013.01)
    *H04N 21/4728* (2011.01)

(52) U.S. Cl.
    CPC ......... *H04N 13/117* (2018.05); *H04N 13/178* (2018.05); *H04N 13/194* (2018.05); *H04N 21/4104* (2013.01); *H04N 21/816* (2013.01); *G06F 3/0482* (2013.01); *H04N 13/344* (2018.05); *H04N 21/4728* (2013.01)

(56) References Cited

U.S. PATENT DOCUMENTS

| | | | |
|---|---|---|---|
| 2010/0162292 A1* | 6/2010 | Potrebic | H04N 5/44543 725/27 |
| 2012/0066304 A1 | 3/2012 | Marmon et al. | |
| 2016/0155187 A1 | 6/2016 | Paulrajan et al. | |
| 2016/0352791 A1* | 12/2016 | Adams | H04L 65/4069 |
| 2018/0035136 A1* | 2/2018 | Crowe | H04N 21/21805 |

OTHER PUBLICATIONS

Kilroy Hughes et al., "Common Media Application Format for Segmented Media", ISO/IEC JTC1/SC29/WG11 N16186, Coding of Moving Pictures and Audio, Jun. 24, 2016, 106 pages.
European Search Report dated Apr. 12, 2019 issued in counterpart application No. 17849170.0-1208, 8 pages.

* cited by examiner

FIG.7A  multi-viewport  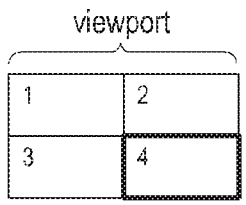
FIG.7B  POI  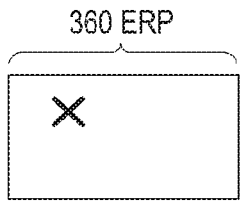
FIG.7C  ROI  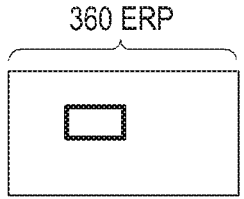
FIG.7D  event  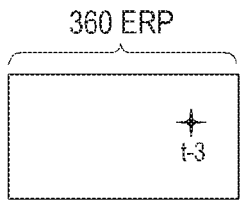
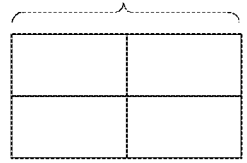
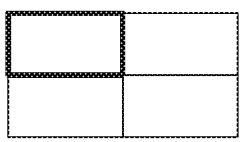
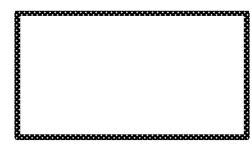
FIG.8A   FIG.8B   FIG.8C

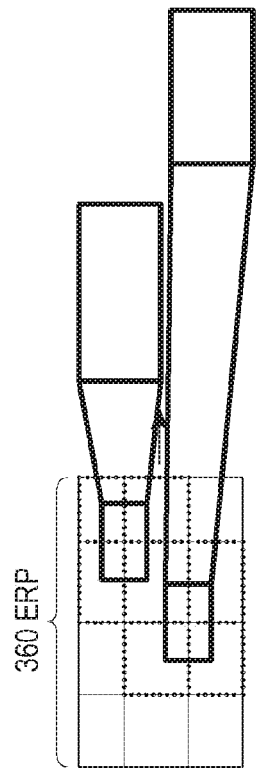
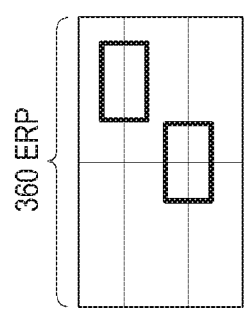
FIG.12B
FIG.12A

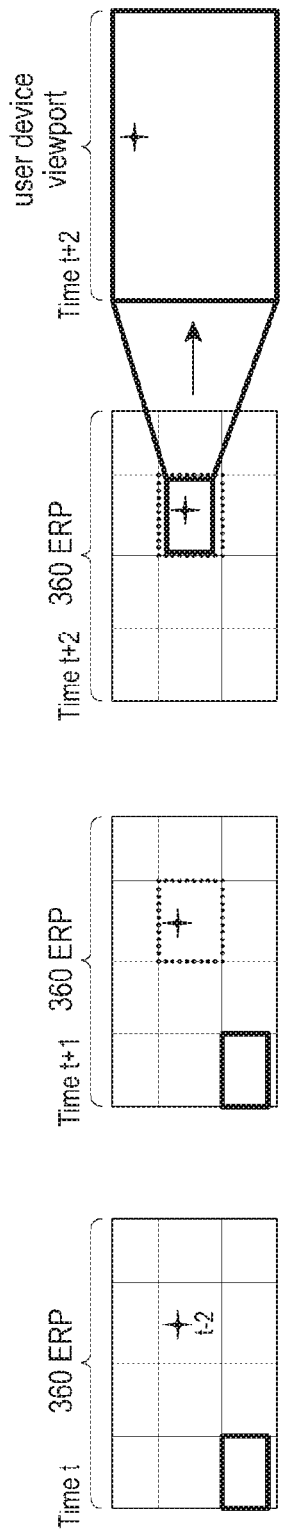

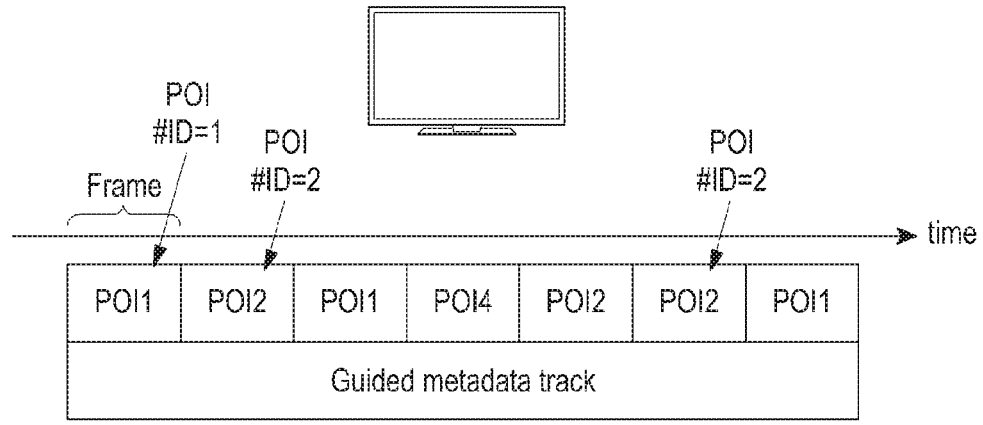
FIG.15
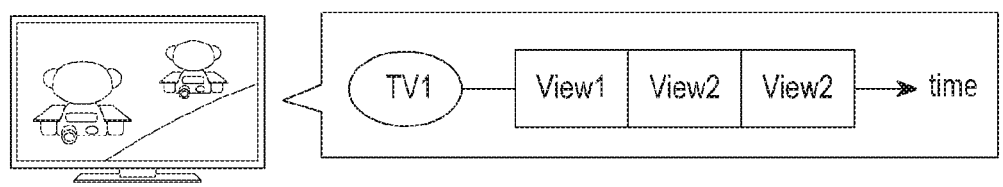
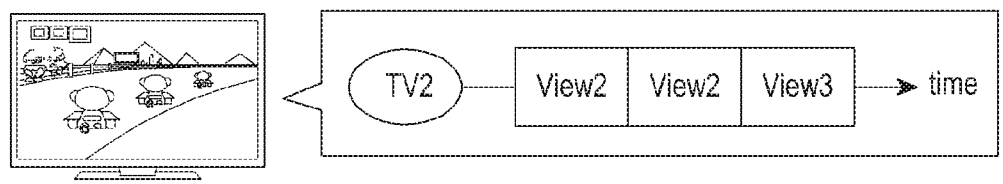
FIG.16

METHOD AND APPARATUS FOR TRANSMITTING AND REPRODUCING CONTENT IN VIRTUAL REALITY SYSTEM

PRIORITY

This application claims priority under 35 U.S.C. § 119(a) to a Korean Patent Application filed on Sep. 12, 2016 in the Korean Intellectual Property Office and assigned Serial No. 10-2016-0117072, the entire content of which is incorporated herein by reference.

BACKGROUND

1. Field of the Disclosure

The present disclosure relates generally to a method and an apparatus for defining metadata for reproducing virtual reality (VR) content, and transmitting and reproducing the content based on the metadata, and more particularly, to a method and an apparatus for defining metadata according to a VR content type and a characteristic of a device that displays the VR content.

2. Description of the Related Art

The Internet is evolving from a human-oriented connection network in which humans generate and consume information, to an Internet of Things (IoT) network in which distributed elements, such as objects and the like, exchange and process information. Internet of Everything (IoE) technology may be an example of a combination of IoT technology and big data processing technology through a connection with a cloud server.

In order to implement the IoT, technical factors such as a sensing technique, wired/wireless communication and network infrastructure, service interface technology, and security technology are required, and thus research is being conducted on a sensor network, machine-to-machine (M2M) communication, machine type communication (MTC), and the like for a connection between objects.

In an IoT environment, through collection and analysis of data generated in connected objects, an intelligent Internet technology (IIT) service to create a new value for peoples' lives may be provided. The IoT may be applied to fields, such as smart homes, smart buildings, smart cities, smart cars, connected cars, smart grids, health care, smart home appliances, or high-tech medical services, through the convergence of the conventional information technology (IT) and various industries.

In addition, consumer media contents are continuously evolving from black and white contents to color contents, high definition (HD) contents, ultra HD (UHD) contents, and the like. Recently, the standardization for high dynamic range (HDR) contents has been established and promoted. Furthermore, VR content had been in an incubation stage before VR devices were distributed.

The characteristic of VR content is different from the characteristic of conventional two dimensional (2D) and three dimensional (3D) content. The VR content may provide users with a 360 degree experience and thus completely immerse users in the experience. However, a content provider may provide a user with content damaged in artistic description since the user freely views the content at 360 degrees.

A VR ecosystem corresponds to a system that monitors a user, allows a user to provide feedback to a content display device or a processing unit through any type of controller, and allows the content display device or the processing unit to control the content by processing the feedback to make interaction possible.

In a VR ecosystem, motion feedback that a user can input to the VR ecosystem through the control device may be divided by a bearing (that is, rotation) and movement (that is, position change). The VR ecosystem should provide VR content according to a user's feedback.

In a VR experience, a field of view (FOV) provided to a user through a display device is also important. A human's general horizontal FOV (or an angle of field) is about 200 degrees. Within 200 degrees, 120 degrees overlap in three dimensions. A display device (for example, a head-mounted device (HMD)) has an FOV of 100 to 120 degrees. Within 120 degrees, 60 degrees correspond to tunnel vision. In a VR ecosystem, a field of regard (FOR) corresponds to a human's FOV. The FOR indicates a degree of spaces that surround a user in a VR ecosystem. For example, an HMD has 100% of a FOR. The reason is that an HMD provides a continuously changed view when a user moves. A FOR of the CAVE™ automatic virtual environment (CAVE™) is dependent on the number of walls used as virtual screens. In contrast, televisions or monitors have a very restricted FOR value. The reason is that VR exists only in the television or the monitor in front of a user and is abruptly discontinued outside the television or the monitor. Accordingly, it is difficult to show VR content through a television or a monitor.

As described above, the content, the display device, and the display situation influence a degree of freedom (DOF) and a screen FOV of the VR content. Accordingly, various types of 360 degree VR content and various display devices used for consuming the VR content should be considered.

In addition, since a user could not control the content DOF in the prior art, a manufacturing intention of a content provider was reflected in the content. The user simply presses a play button, and accordingly, the content is displayed according to the manufacturer's intention. In contrast, since a point of view (POV) cannot be controlled by a manufacturer but can be controlled by a user in 360 degree VR content, content manufacturers do not insert an artistic intention in the content.

With respect to content of which a POV can be controlled by a user such as 360 degree VR content, the user should know display details. However, a current framework (e.g., encoder, file format, transmission system, decoder, display device, or another block within a total content ecosystem) does not provide any hint or guide to a user about where or what the user should view. Further, since conventional content consists of only an image shown on a TV display and thus has a small FOV, there was no need for guided viewing. However, VR 360 degree content existing outside the TV display requires guided viewing.

Accordingly, unlike conventional content, 360 degree VR content requires a framework including metadata for VR reproduction that may provide a user with the best VR experience according to a type and function of a VR content-compatible device of the user.

SUMMARY

An aspect of the present disclosure is to provide a method of defining metadata according to a VR content type and a characteristic of a device that displays the VR content, and an apparatus for the same.

Another aspect of the present disclosure is to provide a method of effectively displaying VR content in a display device based on metadata, and an apparatus for the same.

In accordance with an aspect of the present disclosure, a method of reproducing content by a virtual reality device is provided. The method includes transmitting parameters related to functions of a user device; receiving interest metadata related to content that matches a set of the transmitted parameters; receiving and decoding the content corresponding to a version that matches the set of transmitted parameters in a unit of at least one tile corresponding to a view area to be displayed in accordance with a user's viewpoint based on the interest metadata; and rendering the decoded tile based on the interest metadata.

In accordance with another aspect of the present disclosure, an apparatus for reproducing content in a virtual reality system is provided. The apparatus includes a controller configured to transmit parameters related to functions of a user device and receive interest metadata related to content that matches a set of the transmitted parameters; a decoder configured to receive and decode the content corresponding to a version that matches the set of transmitted parameters in a unit of at least one tile corresponding to a view area to be displayed in accordance with a user's viewpoint based on the interest metadata; and a reproducer configured to render the decoded tile based on the interest metadata.

In accordance with another aspect of the present disclosure, a method of transmitting content by a server in a virtual reality system is provided. The method includes receiving, by a controller, parameters related to functions of a user device; transmitting, by the controller, interest metadata related to content that matches a set of the received parameters; and encoding and transmitting, by an encoder, the content corresponding to a version that matches the set of the received parameters in a unit of at least one tile corresponding to a view area to be displayed in accordance with a user's viewpoint based on the interest metadata.

In accordance with another aspect of the present disclosure, an apparatus for transmitting content in a virtual reality system is provided. The apparatus includes a controller configured to receive parameters related to functions of a user device and transmit interest metadata related to content that matches a set of the received parameters; and an encoder configured to encode and transmit the content corresponding to a version that matches the set of the transmitted parameters in a unit of at least one tile corresponding to a view area to be displayed in accordance with a user's viewpoint based on the interest metadata.

BRIEF DESCRIPTION OF THE DRAWINGS

The above and other aspects, features, and advantages of the present disclosure will be more apparent from the following detailed description, taken in conjunction with the accompanying drawings, in which:

FIGS. 7A, 7B, 7C, and 7D illustrate corresponding interest metadata according to a interest_metadata field and which region or point is specified by each interest metadata;

FIGS. 8A, 8B, and 8C illustrate multi-viewport-based tile transmission;

FIGS. 11A, 11B, 12A, and 12B illustrate a region of interest (ROI) metadata-based tile transmission;

FIGS. 13A, 13B, and 13C illustrate event-based tile transmission;

FIG. 15 illustrates an interest metadata track including individual POI and ROI for each frame;

FIG. 16 illustrates an example for performing restricted playback by using different ROI tracks for interest metadata views from the same 360 degree VR content;

DETAILED DESCRIPTION OF EMBODIMENTS OF THE PRESENT DISCLOSURE

Hereinafter, embodiments of the present disclosure are described in detail with reference to the accompanying drawings. In the following description of the present disclosure, a detailed description of known configurations or functions incorporated herein will be omitted when it is determined that the detailed description may make the subject matter of the present disclosure unclear. The terms as described below are defined in consideration of the functions in the embodiments, and the meaning of the terms may vary according to the intention of a user or operator, convention, or the like. Therefore, the definitions of the terms should be made based on the contents throughout the present disclosure.

Figure 1:
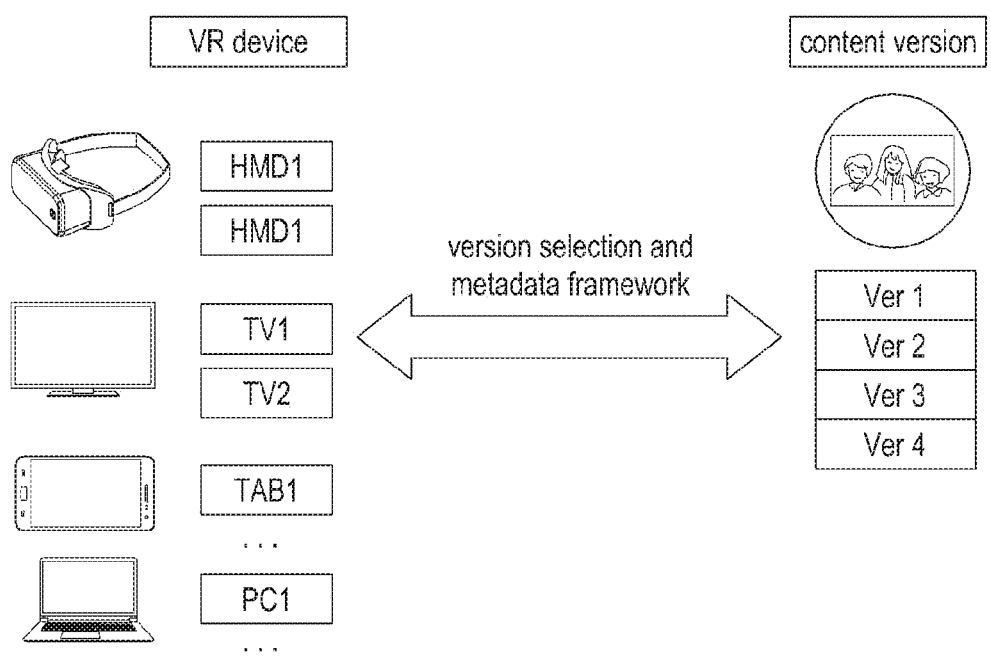
FIG. 1 illustrates a framework for a general VR experience.

FIG. 1 illustrates framework for a normal VR experience.

Referring to FIG. 1, there may be various VR devices and content versions for reproducing VR due to characters of VR content. VR devices may be generally classified according to a device type (HMD, TV, telephone, and the like), but devices in the same category may have different playback functions and characteristics. Accordingly, a user may feel a difference in a VR experience even though devices are in the same category. VR content may also have various characteristics (for example, 180 degree video, 360 degree video, video mapping schemes, an interaction function, and the like) to be reproduced.

However, a current VR system or framework cannot provide a technology for optimally selecting and reproducing VR content versions that match various types of VR devices. Accordingly, the present disclosure provides a method of defining metadata for various types of VR devices and VR content and recognizing, selecting, authenticating, transmitting, and reproducing content version that matches each VR device based on the defined metadata, and an apparatus for the same.

Prior to the description of the method and the apparatus according to the present disclosure, examples of some terms used in the present disclosure that can be interpreted are presented. However, it is noted that the terms are not limited to the examples of the construable meanings which are described below.

An image may be a video or a still image, and an image content may be various multimedia contents including audio data, subtitles, and the like as well as the video and the still image.

VR content includes an image content that provides the image through a 360 degree image, a 3D image, or the like. A media file format may be a media file format according to various media-related standards such as an International Organization for Standardization (ISO)-based media file format (ISOBMFF). A 360 degree image corresponds to an image photographed and stitched by a stitching camera and may provide a 360 degree view when a user changes position or orientation.

A projection refers to processing by which a spherical image for expressing a 360 degree image is projected onto a planar surface or an image frame according to a result of the processing.

Mapping refers to processing by which image data on a planar surface due to projection is mapped to a 2D planar surface or an image frame according to a result of the processing.

Omnidirectional media include an image or a video and/or relevant audio data that can be rendered according to a direction of a movement of a user's head or a user's viewport when the user uses, for example, an HMD.

A viewport may be referred to as an FOV and corresponds to an area of an image (e.g., an area of an image may be an image of a spherical area) viewed by a user at a particular time.

A VR device corresponds to a device that outputs VR content described in the present disclosure and may be referred to as display hardware, a processing unit, a user device, a user equipment (UE), a mobile station (MS), a mobile equipment (ME), a device, a terminal, or the like.

A VR system corresponds to every environment for supporting VR content consumption by a VR device and may be referred to as a VR ecosystem. A fundamental of VR is a system that can monitor a user. The system allows the user to use a kind of controller that provides feedback to a content display device or a processing unit. The system may control the content in accordance with the feedback and enable interaction with the user.

The system may include, for example, at least one of approximate configurations (or functions) shown in the following Table 1.

TABLE 1

| Configuration (or function) | Explanation |
| --- | --- |
| Display hardware | Display device or processing unit. For example, HMD, wireless VR, mobile VR, TVs, and CAVEs ™ |
| User controller | Configuration for providing feedback input to VR system (display hardware). For example, peripherals and haptics |

TABLE 1-continued

| Configuration (or function) | Explanation |
| --- | --- |
| Content capture | For example, camera, video stitching device (for connecting several videos) |
| Content studio | For example, games, live music, cinema, news, and documentary |
| Industrial application | For example, education, health care, real estate, architecture, and travel |
| Production tool & service | For example, 3D engine and power processing |
| Application (App) stores | Provides apps for VR media contents |

A user's feedback input through a controller may be divided into 1) orientation tracking, and 2) position tracking. Orientation tracking corresponds to tracking a rotation (that is, a direction of a user's viewpoint) by a controller and has 3 DOF. Position tracking corresponds to tracking a translation (that is, translation of a user) by a controller and has 3 DOF. Accordingly, when a user experiences VR content, a maximum of 6 DOF are available.

Figure 2:
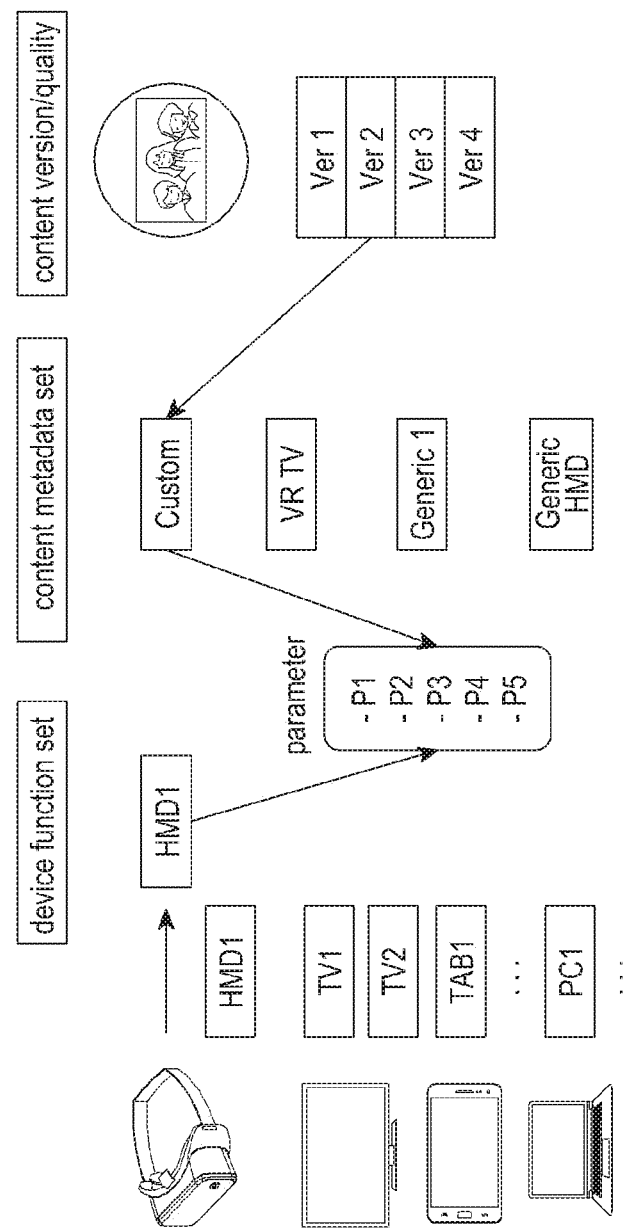
FIG. 2 illustrates a framework for a VR experience according to the present disclosure.

FIG. 2 illustrates a framework for VR experience according to the present disclosure.

Referring to FIG. 2, a plurality of VR devices may be classified into a device function set such as an HMD, a TV, a tablet computer (TAB), and a personal computer (PC) according to their playback functions, and the device function set may be used for recognizing, selecting, and authenticating an optimal content version for optimally reproducing content and content metadata set corresponding to the optimal content version. A content server (or a content media entity) may store a plurality of versions of contents with respect to one content and store a plurality of content metadata for helping and optimizing playback of the content. In order to reproduce the content, the VR device may have an optimal version content to be optimally reproduced and a metadata set corresponding to the optimal version content. In order to reproduce the content, a predetermined version content and metadata set should be transmitted to the VR device, and determination on how the corresponding version content is transmitted is based on a plurality of parameters defined in the device function set and content metadata set described below.

First, parameters indicating VR device functions are defined.

VR devices may be classified into, for example, an HMD, a TV, a TAB, a mobile device, a PC, and a laptop. As described above, the VR devices may be classified according to their basic functions, but even devices in the same category may have different playback functions. For example, two HMD devices may have different functions with respect to screen resolution, screen FOV, an interaction function, and a guided VR function. Accordingly, the present disclosure defines a set of device function parameters that may indicate device functions instead of identifying device functions according to VR device types. The set of device function parameters includes metadata used for making a request for compatible version contents and content metadata. Types of device function parameters are as follows.

1. DOF

Different devices may support different DOF for searching content. For example, the simplest HMDs may support 3 DOF. For example, the user may search bearing tracking (rotation) for various angles of a 360 degree video, and game-oriented HMDs may support a maximum of 6 DOF and also search the rotation tracking as well as movement tracking. Movement tracking is actual position motion tracking and may be performed by another means such as a search input controller. In addition to the bearing and motion tracking, interaction functions such as eye tracking, hand tracking, and an action input (e.g., clicking by a mouse/button) may also be instructed to use VR content.

2. FOV

In close connection with the resolution and size of a VR device screen, a screen FOV indicates a view angle that can be viewed by a user. A human's general horizontal FOV is about 200 degrees. Within 200 degrees, 120 degrees overlap in three dimensions, but a general HMD may provide an angle of field of 90 to 120 degrees corresponding to tunnel vision of 60 degrees. A range of 90 to 120 degrees of an FOV function of the HMD corresponds to a range in which an actual VR experience shown to a user can be greatly changed. When a user views the same angle on different VR devices, a framed image that the user views at a particular time and angle may vary depending on the FOV. Accordingly, content metadata should match an FOV characteristic of the VR device.

3. Screen and Codec Function

In general, when a VR device receives a predetermined version content, a screen and codec function of the VR device should be considered. For example, VR devices receive and decode a complete 360 degree video by default according to a system structure. Accordingly, a codec function of a VR device is important in determining which version of content will be received. However, in a more complex system structure in which only predetermined views are transmitted and rendered in a VR device at a predetermined time, all codec and screen functions such as resolution should be considered for compatibility. Further, although a whole 360 degree video is received, a use case where a partial decoding function is specified and only a user's current view is decoded should be supported.

4. Function of VR Content Mapping Function

VR content is required to be mapped to a planar video before a 360 degree video is encoded and transmitted. Further, when VR content is received, the VR device should support a mapping technology used for mapping the planar video to a 360 degree video. A function of a mapping function of a VR device indicates whether the mapping function for selecting proper version contents and metadata of the corresponding content is supported by the VR device.

5. Guided View/Multi-Camera VR Function

As described above, in 360 degree VR content, when a whole 360 degree video is controlled only by a user, the content manufacturer can hardly control artistic intention. As described above, an automated or guided view may be implemented by a VR device (particularly, an HMD device such as a TV or a PC). Further, according to a device DOF function, automated and/or guided view metadata may be required to provide an accurate VR experience to a user. Accordingly, various types of guided view metadata are defined as content parameter metadata.

Further, VR content may be generated using several 360 degree cameras (VR multi-camera) within the same scene, and in this case, functions of the VR multi-camera may be functions that can be supported by the VR device. For example, movement may be made at various positions within a screen through a plurality of 360 degree cameras.

Device function set metadata is described below.

Device function parameters of the above-described VR devices may be described as metadata within a device function set. Syntax of metadata is as shown in Table 2 below.

TABLE 2 aligned (8) class DeviceCapabilitySet
    unsigned int(8) device_dof;
    unsigned int(16) screen_res_vert;
    unsigned int(16) screen_res_hor;
    unsigned int(16) screen_fov;
    unsigned int(16) codec_support;
    unsigned int(16) mapping_support;
    unsigned int(16) guided_viewing;

device_dof indicates and identifies a functional capability of a device for searching content as it is defined through a filed value regardless of whether the device is limited to a restricted view or has a function for 3/6 DOF tracking. Meanings depending on values of a field of device_dof are as shown in Table 3 below. Among the meanings of the field values, "no motion input function" (such as TVs having no user motion input function) does not necessarily require automated or guided view/playback metadata. The "Motion 3 degrees" indicates a device capability that provides a bearing (rotation) tracking through a basic HMD device having only a head tracking function. "Motion 6 degrees" indicates a device capability that provides rotation and movement tracking through actual position tracking of a user through a controller or an input device. Further, reserved input field values are reserved for interaction availability such as device parameters related to eye tracking, hand tracking, or some interactions.

TABLE 3

| Value | device_dof |
|---|---|
| 0x00 | Reserved |
| 0x01 | No motion input function |
| 0x02 | Motion 3 degrees (rotation) |
| 0x03 | Motion 6 degrees (rotation and movement) |
| 0x04-0xFF | Other reserved inputs | screen_res_vert denotes a vertical screen resolution of a device in the unit of pixels.

screen_res_hor denotes a horizontal screen resolution of a device in the unit of pixels.

screen_fov denotes an FOV capability of a device when 360 degree content is displayed by default. The screen_fov field indicates an accurate FOV value for a screen of a device by degrees. A normal VR device provides an FOV between 90 and 120 degrees.

codec_support denotes a codec resolution support capability of a device. The accurate resolution standard is predefined in advanced video coding (AVC) and high efficiency video coding (HEVC) standards.

mapping_support denotes a mapping support capability of a device. Support of each mapping method algorithm is indicated through a corresponding bit flag (0: not supported and 1: supported) as defined in Table 4 below. Mapping methods depend on a "geometry_type" field of content as defined in the moving picture experts group (MPEG) omnidirectional media application format (OMAF) standard.

TABLE 4

| Mapping element | size | Contents |
| --- | --- | --- |
| Reserved | 2 bits | — |
| Sphere (ERP) | 1 bit | — |
| Squished sphere | 1 bit | — |
| Cylinder | 1 bit | — |
| Platonic solid | 3 bits | 1 bit for cube, 1 bit for octahedron, and 1 bit for icosahedrons |
| Truncated pyramid | 1 bit | — |
| Segmented sphere | 1 bit | — |
| Direct fisheye | 1 bit | — |
| Reserved | 6 bits | Reserved for future mapping types | guided_viewing denotes a device function for supporting various types of guided/automated view metadata as defined in Table 5 as follows.

TABLE 5

| Guide element | size | Contents |
| --- | --- | --- |
| Reserved | 2 bits | — |
| POI | 1 bit | — |
| ROI | 1 bit | — |
| Event | 1 bit | — |
| Reserved | 11 bits | Reserved for future guide element types |

Content parameter metadata is described below.

Content parameter metadata for VR content may be divided into two metadata such as function compatible metadata and transmission/playback support metadata. A content metadata set is not unique for a title of content, but is unique for a particular content version of the corresponding content title. Even though received content titles are the same, various metadata sets may be transmitted to two different VR devices.

Function compatible metadata is used for selecting a VR content version that is compatible with a function of the VR device. When there is no metadata that specifies the parameters, devices can receive non-compatible version content, and accordingly, reproduce inaccurate VR content. For example, an HMD VR device of 3 DOF can receive content of a version that supports 6 DOF. Accordingly, in order to select a VR content version that is compatible with a function of the VR device, the following function compatible metadata is required.

1. DOF

Content versions are generated according to the DOF intended to be reproduced. Most VR content corresponds to 360 degree videos focused on playback in devices capable of searching for 3 DOF. However, some content aims for a device which cannot search for 3 DOF, and in this case, a video view is limited to a predetermined ROI. Accordingly, the VR content may be a video that is less than 360 degrees (for example, 180 degree video) or may provide only a predetermined viewpoint at a given time. In addition, VR content may be generated for a DOF greater than 3 DOF intended to be reproduced. For example, in a case of 6 DOF, a user may search for his/her own position within content. The content may be generated using a plurality of VR cameras in one screen, and in this case, the user may change camera views in accordance with a change in his/her own position in the screen. Further, in order to generate a content environment in which a position search is possible, the content may be mixed with graphics during its generation.

2. Content Resolution and Partial Decoding

Content resolution version should match a decoding capability of a codec function of a target device. Further, a partial decoding (for example, partial decoding using HEVC tiles) supported by the content may be displayed through metadata.

3. Content Mapping Projection 360 degree VR content may be mapped to a planar video in various mapping scheme such as an event related potential (ERP), a cube, a pyramid, and the like before an encoding. Content mapping projection parameters are necessary for accurate rendering of the content in the target device. The parameter matches the "geometry_type" field in the OMAF standard of MPEG.

Transmission/playback support metadata may be used for providing optimal VR experience in the target device when a predetermined compatible version content is selected in consideration of function compatible metadata. Further, according to content version and available interest metadata corresponding thereto, interest metadata-based content may be transmitted using interest metadata that specifies particular regions within the content.

For example, when 360 degree video version content is selected to be reproduced in a TV device having no rotation search function, correct playback support metadata should be first selected and transmitted to the user device. When the user device receives the corresponding playback support metadata, corresponding tiles (tiled content) including content regions may be transmitted based on interest metadata, and thereafter a guided/automated VR view experience may be provided through the user device. In connection with the guided view (tiled) transmission and experience, various types of interest metadata may be defined below.

1. Mapping Projection Plan Configuration

A mapping projection type used for the content is defined in function compatible metadata, but a result planar video may be configured in various schemes that influence quality and playback of the content even though the same mapping projection method is used. The plan configurations are specified for each mapping method and predefined in the standard specification such as MPEG OMAF.

2. Initial Front Point

Mapping requires front point metadata for indicating a default initial front pixel in an encoded planar image (x and y coordinates) to which a 3D geometric surface default front center point is mapped and rendered.

—Geometry Type Surface Default Front Center Points

In order to guarantee consistent mapping of a planar video for 3D geometry through the defined metadata with respect to all devices, a surface default front center point for each geometric type is defined.

The surface default center point defined in the 3D space is a point at an intersection point between a positive x axis and a geometric surface, and a direction of the positive x axis is perpendicular to a geometric front surface.

—Roll, Yaw, and Pitch

The terms roll, yaw, and pitch angle used in the present disclosure are defined along three axes like in the OMAF. A positive direction on the x axis is defined as a front direction for predetermined geometry, the y axis has a direction perpendicular to the x axis and faces upwardly, and the z axis is perpendicular to both the x and y axes.

3. Surface Range Coverage

In a plurality of applications, a VR content video (as indicated by flag entire_surface=0) cannot cover the whole surface of 3D geometry. Particularly, a live VR content video can cover only 180 degrees on the whole surface of 3D geometry. As described above, when only some ranges of geometry are covered by the content video, angle coverage may be specified by a degree_range field.

4. Background Texture Data

VR content may include background texture data used for overlaying geometry in the following cases.

1) a case where a content video cannot cover the whole surface of 3D geometry: background texture data may be used for overlaying regions of the surface that are not covered by content video data.

2) a case where a viewport based or interest metadata-based tile transmission mechanism is used: background texture data may be used for overlaying regions of the surface when there is a sufficient system delay to refresh and transmit tiles for rendering a viewport according to a rapid motion change by the user. For both the above cases, the background texture data may include static images, an encoded I frame, or another track video data.

5. Frame Default Viewport and Geometric Rotation

According to geometry used for mapping and projection, a content or service provider may select dynamical mapping of a 360 degree video screen based on a particular mapping geometric characteristic. For example, when geometry has an asymmetrical characteristic for one direction based on screen quality and distortion, an important matter within a 360 degree frame may be mapped to particular orientation of geometry. Further, when the 360 degree video is decoded and rendered, total geometry may be required to rotate to use a point, not a surface default front center point, as a front based on a geometric type.

A frame default front field specifies another point in an encoded screen to be used to be mapped to the (geometric) surface default front center point according to each content frame (that is, dynamically). A geometric rotation field specifies an amount of rotation of geometry for default orientation (here, the surface default front center point is the front).

6. Guided View/FOV Metadata

There may be various types of metadata which can be used for specifying tiled transmission and implementing guided or automated view playback through devices. All types of interest metadata may be static or dynamically specified for a frame or a screen.

Guided view/FOV metadata may include POI metadata, ROI metadata, and event metadata.

A point within a 360 degree (or another) video is indicated by POI metadata. A target VR device may use the metadata for interest metadata tile-based transmission and/or point-based guided or automated playback.

ROI metadata may specify a particular region within a 360 degree (or another) video and may be used for interest metadata tile-based transmission and/or playback. The simplest ROI metadata specifies one region on the sphere surface as an ROI region. The ROI metadata specifies a predetermined region within a 360 degree content video intended to be displayed by a target device. The ROI region may be a particular FOV or a region greater than or less than the intended FOV. When various sets of various ROI metadata exist for various region sizes and FOVs, the closest set should be selected to match the ROI region with the target device. When the selected ROI metadata region size or FOV does not completely match the device FOV, FOV compensation is needed during ROI-based playback. The FOV compensation is described below.

The event metadata may be used by the target device to predict and receive video tiles through event generation within content having a particular position (e.g., one point within a 360 degree video), "event time," and interest metadata tile-based transmission, and to guide the user to turn his/her eyes to the event within the content.

As described-above ROI, POI, event, and interest metadata concepts for the corresponding metadata may bridge a gap between conventional content and 360 degree VR content including and expressing the manufacturer's artistic intention. To this end, according to the present disclosure, a content transmission device performs interest metadata-based tile transmission and a VR device performs interest metadata-based view by the transmission device. The interest metadata may be used for tile-based transmission through points and regions specified by the interest metadata. Further, the interest metadata may be used for providing guided view experiences to a user by VR devices, and ROI and POI metadata may be used for generating playback lists and easily selecting a predetermined viewpoint at a predetermined time by the user.

However, the present disclosure is not limited to the above-described application and the use of ROI and POI metadata concepts to interest metadata-based transmission/view only, but may be used for supporting view dependent processing such as view dependent variable ROI/POI encoding and/or decoding, view dependent ROI/POI tone mapping, and view dependent ROI/POI tile buffer selection. When a user's current viewport includes a predetermined POI, determining event triggering may be supported.

A syntax of a content metadata set is shown below in Table 6.

TABLE 6

```
aligned (8) class ContentMetadataSet
Fixed metadata (changeable in every content sample)
    unsigned int(8) content_dof;
    if (content_dof == 2) {
      unsigned int(8) no_of_viewports;
      for (i=1; i<= no_of_viewports; i++ {
        unsigned int(16) viewport_id;
        unsigned int(16) left_horizontal_offset;
        unsigned int(16) top_vertical_offset;
        unsigned int(16) viewport_width;
        unsigned int(16) viewport_height;
      {
      if (content_dof == 3) {
if (!is_default_front) {
   unsigned int(16) initial_front_x;
   unsigned int(16) initial_front_y;
}
unsigned int(1) entire_surface;
if (!entire_surface) {
        unsigned int(8) degree_range;
        if (degree_range == 3) {
          unsigned int(8) hor_range;
          unsigned int(8) vert_range;
}
    }
    unsigned int(16) content_res_vert;
    unsigned int(16) content_res_hor;
    unsigned int(16) mapping_projection;
    for (i=1; i<= mapping_projection; i++) {
      unsigned int (8) planar_arrangement;
    }
unsigned int(1) background;
if (background == 1) {
        unsigned int(8) background_type;
   unsigned int(16) background_pitch_start;
   unsigned int(16) background_yaw_start;
   unsigned int(16) background_pitch_end;
   unsigned int(16) background_yaw_end;
}
Dynamic metadata (changeable in every sample/frame)
unsigned int(1) frame_default_front;
unsigned int(1) geometry_rotation;
if (frame_default_front) {
        unsigned int(16) frame_default_front_x;
        unsigned int(16) frame_default_front_y;
}
```

TABLE 6-continued

```
if (geomtry_rotation) {
        unsigned int(16)   geometry_rotation_pitch;
        unsigned int(16)   geometry_rotation_front_yaw;
        unsigned int(16)   geometry_rotation_front_roll;
}
unsigned int(16) interest_metadata
        if (interest_metadata  == 1) {
            unsigned  int(8) no_of_viewports;
            for  (i=1; i<= no_of_viewports; i++ {
              unsigned   int(16) viewport_id;
              unsigned   int(16) left_horizontal_offset;
              unsigned   int(16) top_vertical_offset;
              unsigned   int(16) viewport_width;
              unsigned   int(16) viewport_height;
        } else  if(interest_metadata == 2){
            unsigned   int(8) no_of_POI;
            for  (i=1; i<= no_of_POI; i++ {
              unsigned   int(16) POI_id;
              signed   int(16) POI_yaw;
              signed   int(16) POI_pitch;
        } else  if(interest_metadata == 3){
            unsigned   int(8) no_of_ROI;
            for  (i=1; i<= no_of_ROI; i++ {
              unsigned   int(16) content_fov;
              unsigned   int(16) ROI_id;
              signed   int(16) ROI_pitch_start;
              signed   int(16) ROI_yaw_start;
              signed   int(16) ROI_pitch_end;
              signed   int(16) ROI_yaw_end;
        } else  if(interest_metadata == 4){
            unsigned   int(8) no_of_events;
            for  (i=1; i<= no_of_events; i++ {
              unsigned(16)   event_id;
              signed(16)   event_pitch;
              signed(16)   event_yaw;
              unsigned   int(16) time_to_event;
        }
``` content_dof denotes a DOF implemented in content of a version intended to be reproduced.

The meanings of values of content_dof are shown below in Table 7. When content_dof=1, the content is a 2D video having only a single viewport. When content_dof=2, the content is a 2D video configured by a plurality of predefined viewports (selected by a 360 degree video or something similar thereto).

TABLE 7

| Value | content_dof |
|---|---|
| 0x00 | Reserved |
| 0x01 | Single viewport |
| 0x02 | Multi-viewport |
| 0x03 | Motion 3 degrees (rotation) |
| 0x04 | Motion 6 degrees (rotation and movement) |
| 0x05-0xFF | Other reserved inputs | no_of_viewports denotes a number of multiple viewports within the content when content_dof=2.

viewport_id denotes an ID of a corresponding specified viewport.

left_horizontal_offset, top_vertical_offset, viewport_width, and viewport_height denote integer values indicating positions and sizes of multiple viewports. left_horizontal_offset and top_vertical_offset indicate horizontal and vertical coordinates of an upper left corner of a corresponding viewport in connection with a basic region through brightness samples. viewport_width and viewport_height indicate a width and a height of a corresponding viewport through brightness samples.

is_default_front denotes the existence of initial_front_x and initial_front_y when a corresponding field value is 0, and denotes the non-existence of initial_front_x and initial_front_y when a corresponding field value is 1.

initial_front_x and initial_front_y denote x and y coordinates of a point in an encoded image to which a 3D geometric surface default front center point is mapped and rendered.

entire_surface denotes whether a video covers a total geometric volume in a case of content_dof=3 (content of motion 3 degrees). When a value of entire_surface is 1, rendering can be made with a video in a track to which all geometric surfaces (360 degrees) are referred. When entire_surface is 0, texture of some geometric regions may be provided by means other than the current track.

degree_range denotes a coverage degree of the content in a case of content_dof=3 (content of motion 3 degrees) according to Table 8 below. degree_range denotes a coverage degree of the content (geometric surface) to be rendered with the video within the referred track when entire_surface=0.

TABLE 8

| Value | degree_range |
|---|---|
| 0x00 | Reserved |
| 0x01 | 180 degrees |
| 0x02 | 270 degrees |
| 0x03 | Restricted view |
| 0x04-0xFF | Other reserved ranges | hor_range denotes a degree of a range of a horizontal level of a content when degree_range=3 (that is, when the content has a restricted view).

vert_range denotes a degree of a range of a vertical level of content when degree_range=3 (that is, when the content has a restricted view).

content_res_vert denotes a vertical screen resolution of content in the unit of pixels.

content_res_hor denotes a horizontal screen resolution of content in the unit of pixels.

mapping_projection denotes a mapping projection type used for content version. This field corresponds to a geometry_type field defined in the MPEG OMAF standard as shown below in Table 9.

TABLE 9

| Value | mapping_projection |
|---|---|
| 0x00 | Reserved |
| 0x01 | Sphere (ERP) |
| 0x02 | Squished sphere |
| 0x03 | Cylinder |
| 0x04 | Platonic solid |
| 0x05 | Truncated pyramid |
| 0x06 | Segmented sphere |
| 0x07 | Direct fisheye |
| 0x08-0xFF | Reserved | planar_arrangement denotes a planar configuration used for particular mapping projection. For example, in a case of mapping_projection=4, a planar_arrangement field indicates how planar regular polyhedron surfaces are configured within a planar video.

background denotes whether there is background texture data other than a video in a currently provided track. When a value of the field is 1, a background texture mapping type is specified by a corresponding region location by a background type and a background region. background type denotes a texture data type for the background, not the video in the currently provided track as shown in Table 10 as follows.

TABLE 10

| Value | Background_type |
|---|---|
| 0x00 | Reserved |
| 0x01 | Static image |
| 0x02 | I-frame |
| 0x03 | Other track video |
| 0x04-0xFF | Reserved | background_pitch_start/end and background_yaw_start/end denote pitch and yaw angles of a start and an end of a particular region of background texture data, respectively.

frame_default_front denotes the existence of frame_default_front_x and frame_default_front_y for a predetermined sample or frame when a value of this filed is 0, and denotes the non-existence of frame_default_front_x and frame_default_front_y for a predetermined sample or frame when a value of this filed is 1.

geometry_rotation denotes the existence of geometry_rotation_pitch, geometry_rotation_yaw, and geometry_rotation_roll for a predetermined sample or frame when a value of this filed is 0, and denotes the non-existence of geometry_rotation_pitch, geometry_rotation_yaw, and geometry_rotation_roll for a predetermined sample or frame when a value of this filed is 1.

planar default_front_x, y denotes x and y coordinates of a point in a planar encoding picture frame to which a 3D geometric surface default front center point is mapped and rendered.

geometry_rotation_pitch, yaw, roll denotes a total rotation angle at which 3D geometry for default orientation (surface default front center is the front) rotates.

interest_metadata denotes a type of interest metadata included in content metadata set as shown below in Table 11.

TABLE 11

| Value | Interest_metadata |
|---|---|
| 0x00 | Reserved |
| 0x01 | Multi-viewport |
| 0x02 | POI |
| 0x03 | ROI |
| 0x04 | Event |
| 0x05-0xFF | Reserved | no_of_viewports, viewport_id, left_horizontal_offset, top_vertical_offset, viewport_width, and viewport_height correspond to function compatible metadata and are required for reproducing a multi-viewport.

POI_id, yaw, and pitch denote an ID of a point of interest indicated by POI metadata for a predetermined sample/frame, a yaw, and a pitch, respectively.

content_fov denotes a default POV specified by interest_metadata in a content metadata set when interest_metadata=2 (that is, ROI metadata). FOVs depending on values are shown below in Table 12.

TABLE 12

| Value | Content_fov |
|---|---|
| 0x00 | Reserved |
| 0x01 | 80 |
| 0x02 | 90 |
| 0x03 | 95 |
| 0x04 | 100 |
| 0x05 | 105 |
| 0x06 | 110 |
| 0x07 | 120 |
| 0x08-0xFF | Reserved |

ROI_id, yaw, pitch, start, and end denote an ID of a region of interest indicated by ROI metadata for a predetermined sample/frame, a yaw indicating a rotation angle based on a z axis, a pitch indicating a rotation angle based on a y axis, a start, and an end, respectively.

event_id, yaw, and pitch denote an ID of an event indicated by event metadata for a predetermined sample/frame, a yaw, and a pitch, respectively.

time_to_event denotes an amount of remaining time in the unit of millimeter seconds until an event starts.

The operation of the system using metadata according to the present disclosure is described below.

The operation of the system according to the present disclosure will be schematically described first. A metadata set is determined, content is (tile-) transmitted based on interest metadata, and finally the VR device displays VR content based on the interest metadata.

Metadata set determination corresponds to a procedure of determining and selecting a content version related to the VR device and content metadata corresponding to the content. A method of transmitting the determined version content and content metadata to the device depends on interest metadata-based (tile) transmission.

Figure 3:
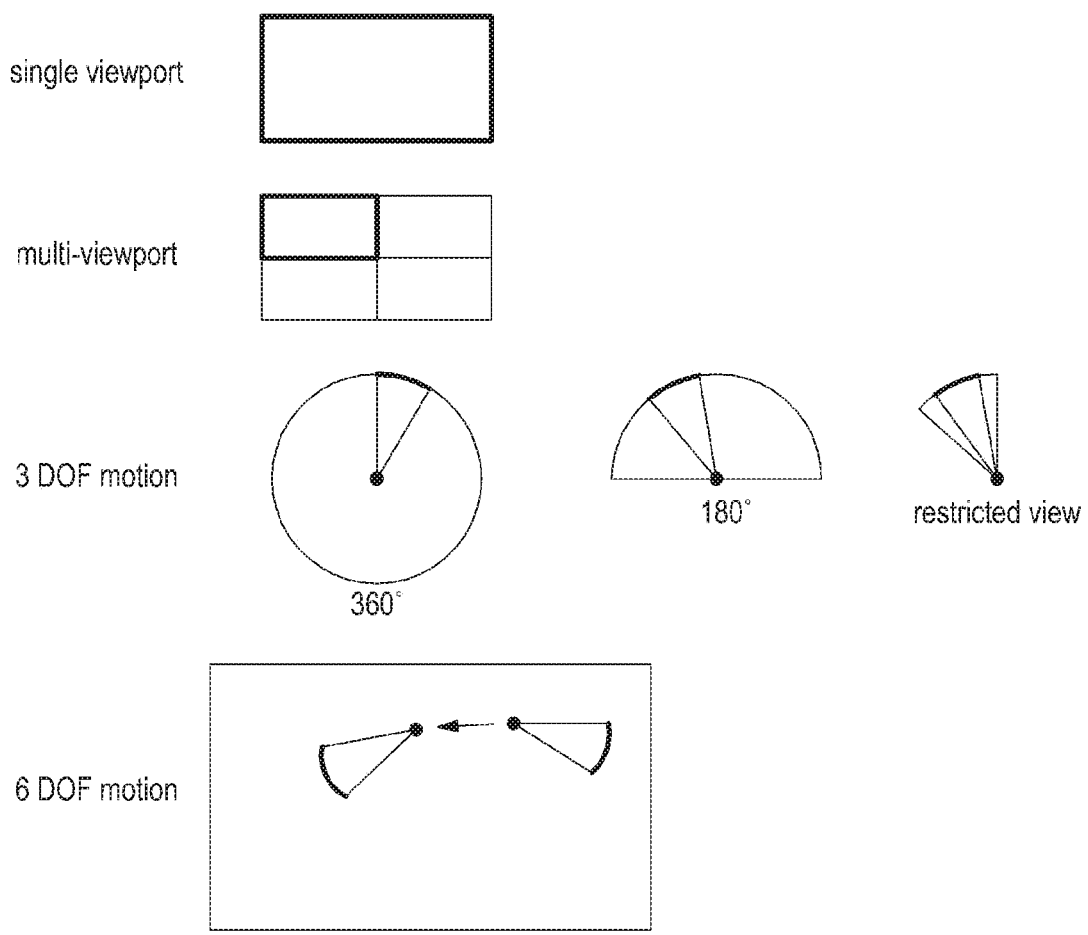
FIG. 3 illustrates types of VR content (content_dof and degree_range) according to the present disclosure.

FIG. 3 illustrates types of VR content (content_dof and degree_range) according to the present disclosure.

Referring to FIG. 3, a case is illustrated where the number of viewports is one, and a case is illustrated where the number of viewports is plural (four). In addition, a case of 3 DOF is illustrated in which X (horizontal), Y (vertical), and Z (depth) can move, and a case of 6 DOF is illustrated in which all operational elements used in a virtual reality system, that is, X (horizontal), Y (vertical), Z (depth), pitch, yaw, and roll can move. Bold lines in FIG. 3 indicate areas which can be viewed by a user at given viewpoints and viewports.

Figure 4:
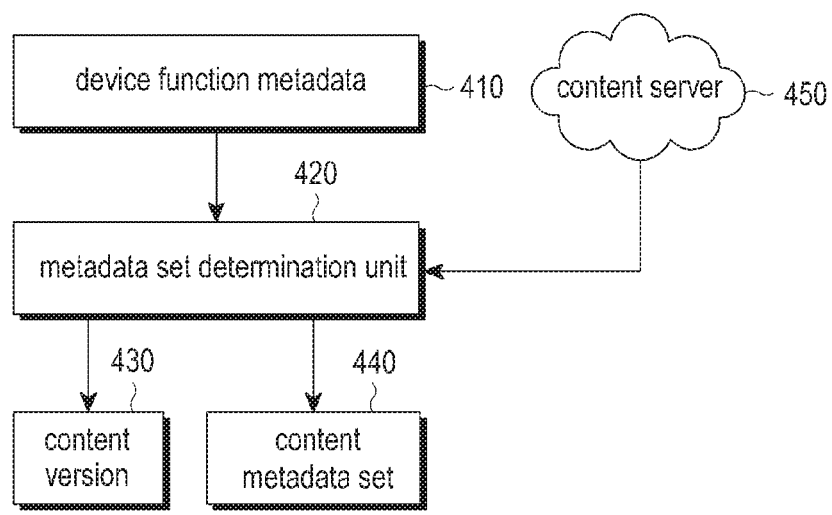
FIG. 4 is a block diagram of an apparatus for determining a metadata set according to the present disclosure.

FIG. 4 is a block diagram of an apparatus for determining a metadata set according to the present disclosure.

Referring to FIG. 4, a device according to the present disclosure may include a metadata set determination unit 420 for determining a metadata set, where the metadata set determination unit 420 receives device function set metadata 410 and determines and outputs a version of content 430 compatible with a user's target device and content metadata 440 required/useful for reproducing the corresponding content version in the target device.

The metadata set determination unit 420 receives the device function set metadata 410 to select the content version 430 and the relevant content metadata 440. When the metadata set determination unit 420 determines and makes a request for the content of the version compatible with the VR device of the user and the content metadata, the metadata set determination unit 420 may exist within a VR device of the user or within an external entity such as a content server 450. In the latter case, a negotiation session between entities may be necessary.

Figure 5:
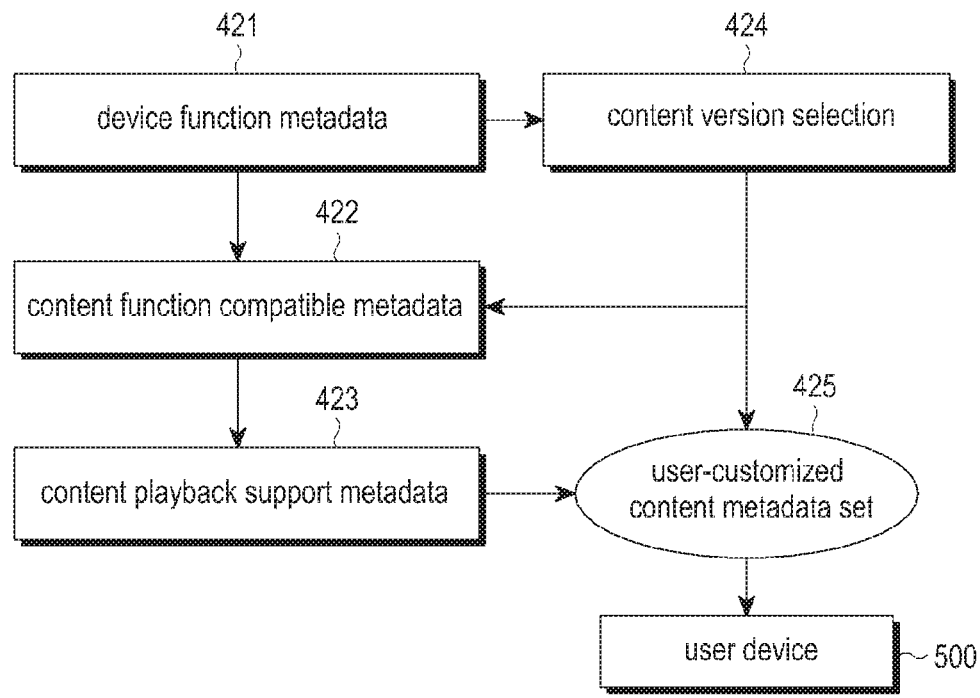
FIG. 5 is a flowchart of a method of an operation of the metadata set determination unit of FIG. 4 according to the present disclosure.

FIG. 5 is a flowchart of a method of an operation within the metadata set determination unit 420 of FIG. 4 according to the present disclosure.

Referring to FIG. 5, the metadata set determination unit 420 receives device function metadata in step 421 for the corresponding device and selects a compatible version of content in step 424 based on the received device function metadata. Then, the metadata set determination unit 420 determines content function-compatible metadata in step 422 based on the device function metadata in step 421 and the selected version content in step 424. Further, the metadata set determination unit 420 determines content playback support metadata in step 423 based on the content function-compatible metadata in step 422, determines a user-customized content metadata set in step 425 based on the selected version content in step 424 and the determined content playback support metadata in step 423, and transmits the determined user-customized content metadata set in step 425 to a user device in step 500.

The user device in step 500 may make a request for a transport mechanism (for example, interest metadata-based (tile) transport) for the corresponding version content based on the playback support metadata in step 423 within the received content metadata set in step 425 and also reproduce an optimal version content (for example, interest metadata-based view).

Further, the metadata set determination unit 420 may determine to select the relevant version content in step 424 and the content playback support metadata in step 423 with respect to each device function set parameter.

Table 13 below shows DOF determination for selecting content version and interest metadata, and more particularly, device_dof and content_dof fields, and determination results which can be made by the metadata set determination unit according to whether particular interest_metadata can be used or not.

When device_dof<content_dof, the content can be reproduced only under a condition in which required interest_metadata exists.

Further, in order to determine codec resolution compatibility, the metadata set determination unit 420 identifies a codec_support field and selects content of a version having content_res_vert/hor which can be decoded by the codec.

In order to determine mapping compatibility, the metadata set determination unit 420 identifies a mapping_support field and selects content of a version having a mapping_projection field corresponding to one of supportable mapping projections indicated by mapping_support.

In order to determine interest metadata, the metadata set determination unit 420 first identifies a device_dof field. When device_dof=1, a guide element within a guided_viewing field is identified through corresponding transmitted interest_metadata. When device_dof=1 and no guide element is supported, the VR device cannot reproduce any VR content. When device_dof=2 or 3, supported interest_metadata can be transmitted. Accordingly, the VR device having device_dof=1 may support full playback (single viewport and multi-viewport) or restricted playback according to the guided_viewing field and available interest_metadata.

In ROI interest metadata, an accurate FOV may vary depending on device screen_fov and content_fov fields. Operations for selecting and compensating for interest_metadata having the FOV closest to the device is described below.

Interest metadata may be specified by a predetermined version content and may be applied to two or more content versions according to availability and application of interest metadata during the generation of content/content metadata.

Figure 6:
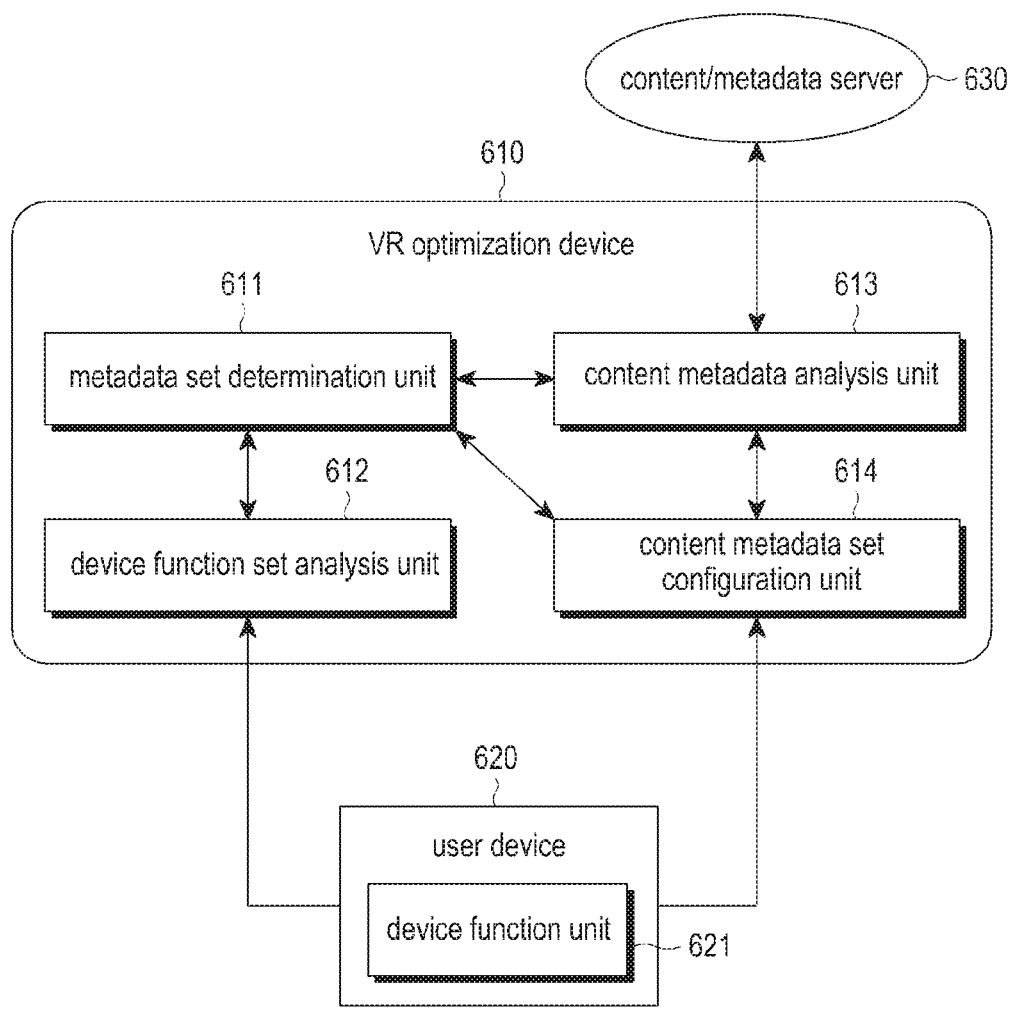
FIG. 6 is a block diagram of an apparatus for determining a metadata set according to the present disclosure.

FIG. 6 is a block diagram of an apparatus for determining a metadata set according to the present disclosure.

Referring to FIG. 6, a VR optimization device 610 selects a relevant version content and a content metadata set. The

TABLE 13

| Device | Content | | | |
| --- | --- | --- | --- | --- |
| | Single viewport | Multi-viewport | 3 DOF | 6 DOF |
| No motion | Full playback | Full playback interest_metadata = 1 | Restricted playback interest_metadata = 3 | Restricted playback interest_metadata = 3 |
| 3 DOF | Full playback | Full playback interest_metadata = 1 | Full playback interest_metadata = 2, 3, 4 | Restricted playback interest_metadata = 5 |
| 6 DOF | Full playback | Full playback interest_metadata = 1 | Full playback interest_metadata = 2, 3, 4 | Full playback interest_metadata = 2, 3, 4 |

In Table 13 above, full playback is referred to in connection with a DOF version of content (full playback of a multi-viewport content corresponds to a function selected by the device among a plurality of viewports) and restricted playback indicates restricted view playback of content using interest_metadata.

In order to determine the DOF, the metadata set determination unit 420 identifies a device_dof field and selects content of a version having a content_dof field corresponding to a value which is less than or equal to "full playback". When device_dof=3, content_dof<=3 may be selected according to availability. That is, content of a version corresponding to device_dof=>content_dof is selected.

VR optimization device 610 may include a metadata set determination unit 611, a device function set analysis unit 612, a content metadata analysis unit 613, and a content metadata set configuration unit 614. The VR optimization device 610 may be included in a user device 620 or a content/metadata server 630 or may be configured as a separate device.

The device function set analysis unit 612 analyzes and identifies components within a device function set acquired from the user device 620. The metadata set determination unit 611 receives outputs from the device function set analysis unit 612 and the content metadata analysis unit 613, and determines and outputs a suitable metadata set. The content metadata analysis unit 613 acquires content metadata from the content server 630, analyzes an input into the metadata set determination unit 611, and processes an interaction with the metadata set determination unit 611. The content metadata set configuration unit 614 configures certain metadata that is determined by the metadata set determination unit 611 and provided through the content metadata analysis unit 613 from the metadata server 630.

The user device 620 may include a device function unit 621, and the device function unit 621 may analyze functions of the user device 620, and generate and transmit a device function set.

Interest Metadata-Based (Tile) Transmission:

When the content version and the content metadata set are determined by the metadata set determination unit, the determined version content may be transmitted to the user device through various methods based on content metadata. Accordingly, content interest_metadata may be used for all of content transmission and content playback/view described below.

Table 14 shows types of interest metadata as follows.

TABLE 14

| | | Content | | |
|---|---|---|---|---|
| Interest metadata | Single viewport | Multi-viewport | 3 DOF | 6 DOF |
| Multi-viewport | N/A | interest_metadata = 1 | N/A | N/A |
| POI | N/A | N/A | interest_metadata = 2 | interest_metadata = 2 |
| ROI | N/A | N/A | interest_metadata = 3 | interest_metadata = 3 |
| Event | N/A | N/A | interest_metadata = 4 | interest_metadata = 4 |

Referring to Table 14 above, while multi-viewport interest metadata may be applied only to a multi-viewport content, POI, ROI, and event interest metadata may be applied to all of 3 DOF and 6 DOF contents.

FIGS. 7A, 7B, 7C, and 7D illustrate corresponding interest metadata according to the interest_metadata field and which region or point is specified by each interest metadata.

Referring to FIGS. 7A, 7B, 7C, and 7D, FIG. 7A illustrates a case where interest_metadata is the multi-viewport, and an ID and a position of a guided viewport may be specified using viewport_id. FIG. 7B illustrates a case where interest_metadata is a POI, and a particular point within a 360 degree video space may be specified using POI_id, POI_yaw, and POI_pitch. FIG. 7C illustrates a case where interest_metadata is an ROI, and an accurate viewport within a 360 degree video space may be specified using ROI_id, ROI_pitch_start, ROI_yaw_start, ROI_pitch_end, and ROI_yaw_end. FIG. 7D illustrates a case where interest_metadata is an event, and a position and a time of an event to occur in the future within content may be specified using event_id, event_yaw, event_pitch, and event_to_event.

FIGS. 8A, 8B, and 8C illustrate multi-viewport-based tile transmission.

Referring to FIGS. 8A, 8B, and 8C, multi-viewport interest metadata specifies an accurate position, size, and ID of each viewport within a multi-viewport content. For example, it is possible to make a request for only a corresponding tile by selecting a particular viewport through interest metadata. Since each viewport is encoded as an individual tile, tiles corresponding to selected/shown viewports may be selectively transmitted for multi-viewport-based tile transmission, and thus a bandwidth can be saved. FIG. 8A illustrates that multi-viewport content is encoded in four tiles corresponding to a viewport, FIG. 8B illustrates that an upper left tile is selected through top_left_viewport_interest metadata, and FIG. 8C illustrates that the selected tile/viewport is transmitted and rendered by a user device. Accordingly, the user device may reproduce accurate viewport(s).

In addition, POI metadata specifies points within a VR content video corresponding to POIs such as a person, object, or another interest (made by content generator, provider, or users). Tile transmission may be performed based on POIs specified by metadata.

Figure 9A:
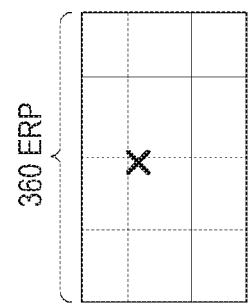
FIGS. 9A, 9B, 9C, 10A, 10B, and 10C illustrate a point of interest (POI) based tile transmission operation.
Figure 9B:
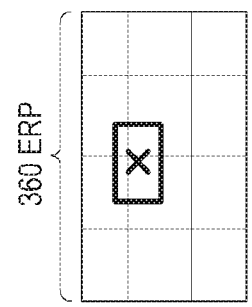
Figure 9C:
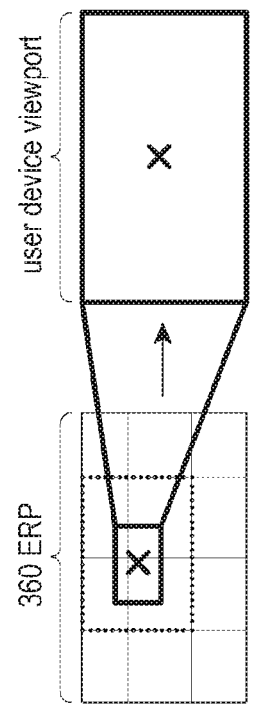

FIGS. 9A, 9B, and 9C illustrate a POI-based tile transmission operation when only one POI exists in POI metadata for a given frame.

Referring to FIGS. 9A, 9B, and 9C, FIG. 9A illustrates encoded 360 degree content within 12 tiles having POI interest_metadata, and FIG. 9B illustrates that a viewport surrounding the POI is calculated using POI metadata and FOV metadata of the device or content (device screen_fov or content_fov). FIG. 9C illustrates the number of tiles (four tiles are needed in FIG. 9) required for transmission to render a viewport including POI, and transmission and rendering of the tiles identified by the user device to reproduce the viewport including the POI.

Figure 10C:
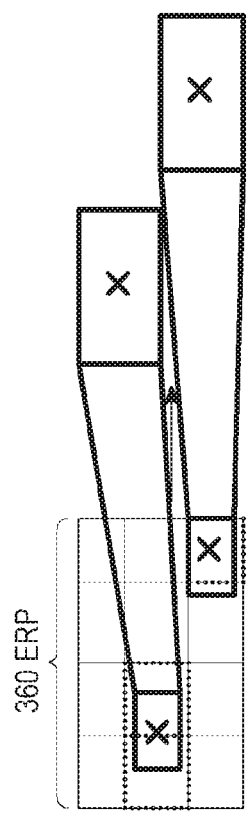
Figure 10B:
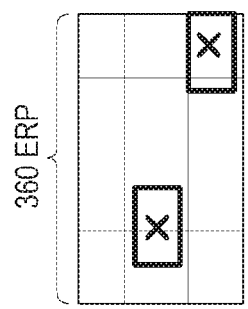
Figure 10A:
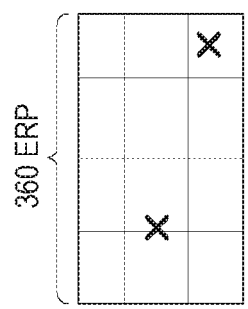

FIGS. 10A, 10B, and 10C illustrate a POI-based tile transmission operation, that is, a basic operation of the POI-based tile transmission when two POIs exist within interest metadata for a given frame.

Referring to FIGS. 10A, 10B, and 10C, the same process as FIGS. 9A, 9B, and 9C are performed for each of two POIs and the POIs may be transmitted to the user device. The user device renders only a viewport corresponding to a current view POI between the transmitted two POIs and a viewport corresponding to the other POI is prepared for fast rendering as necessary (when the user selects/searches for it on the POIs and around them) in FIG. 10C.

When POI-based tile transmission is used for transmitting content to a device having no motion function (device_dof=1), identified and transmitted tiles are enough for restricted playback. However, when the user searches for a viewport for a view in which tiles are not transmitted to devices having a motion function (device_dof=2, 3), the tiles for the found viewport may be transmitted immediately (with a little delay) or a background low-resolution view/background fixed image may be displayed while the tiles are requested and transmitted.

In addition, the ROI metadata specifies an accurate region within VR content video corresponding to operations generated in a predetermined region or content-specific objects. The region size of ROI may be greater than that of average viewport/device FOVs, aim the device FOVs, or less than that of average viewport/device FOVs.

When the ROIs aim the device FOV viewports (cut viewports of content producers or viewports of other previous users), the size of the ROIs matches the size of the device FOVs, and thus a specific artistic intention of the producer of the 360 degree VR content may be transmitted to the user through the device based on the ROI metadata. Further, regardless of the size of the ROI, ROI-based tile transmission may be performed for all regions.

Figure 11A:
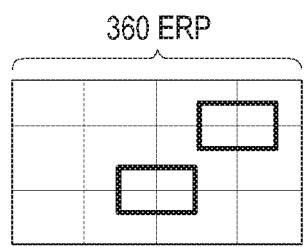
Figure 11B:
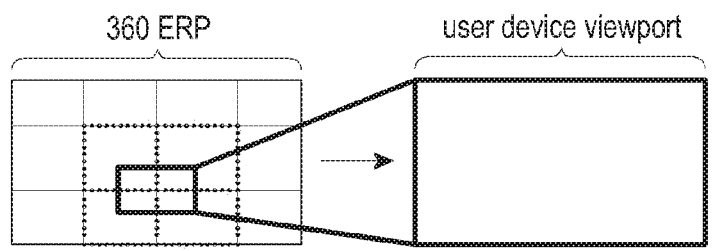

FIGS. 11A and 11B illustrate ROI metadata-based tile transmission, that is, ROI-based tile transmission when one ROI exists within interest metadata for a given frame. For example, a certain ROI size matches the size of the viewport of the user device.

Referring to FIGS. 11A and 11B, FIG. 11A illustrates 360 degree content that has ROI interest metadata and is encoded in 12 tiles, FIG. 11B illustrates that 4 tiles required for transmission are identified for ROI rendering, and transmission and rendering of the tiles identified for ROI playback.

FIGS. 12A and 12B illustrate ROI metadata-based tile transmission, that is, ROI-based tile transmission when a plurality of (two in FIGS. 12A and 12B) ROIs exists within a given frame. For example, certain ROI sizes match the size of the viewport of the user device.

Referring to FIGS. 12A and 12B, FIG. 12A illustrates 360 degree content that has two ROI interest metadata and is encoded in 12 tiles, FIG. 12B illustrates that 7 tiles required for transmission are identified for two ROI rendering, and transmission and rendering of the tiles identified for ROI playback. The user device renders only a viewport corresponding to a current view ROI between the transmitted two ROIs, and a viewport corresponding to the other ROI is prepared for fast rendering as necessary (when the user selects/searches for it on the ROIs and around them) in FIG. 12B.

In the ROI playback, an ROI content_fov value and a device screen_fov value may be different depending on the size of a region specified by ROI metadata. In this case, FOV compensation is needed. Operations for the FOV compensation will be described below.

Like the POI-based tile transmission, when ROI-based tile transmission is used for transmitting content to a device having no motion function (device_dof=1), identified and transmitted tiles are enough for restricted playback. In this case, FOV compensation may be needed. However, when the user searches for a viewport for a view in which tiles are not transmitted to devices having a motion function (device_dof=2, 3), the tiles for the found viewport may be transmitted immediately (with a little delay) or a background low-resolution view/background fixed image may be displayed while the tiles are requested and transmitted.

In addition, event interest metadata may be specified by a specific point within a VR content video space or a time (time_to_event field) until the event is generated at the specific point. Through time_to_event fields, important tiles that should be transmitted in the event-based tile transmission may be identified in advance through event interest metadata and transmitted to the user device.

FIGS. 13A, 13B, and 13C illustrate event-based tile transmission when one event is described within interest metadata.

Referring to FIGS. 13A, 13B, and 13C, FIG. 13A illustrates a 360 degree content encoded in 12 tiles with a user's current viewport and an event having time_to_enet=2, FIG. 13B illustrates that event metadata and device fov or content_fov are used for transmitting tile(s) corresponding to event metadata before a time indicated by an event, and FIG. 13C illustrates transmission of corresponding tile(s) before the event is generated as described by time_to_event. Accordingly, a delay in the event-based tile transmission and rendering can be removed.

As described above, since the event-based tile transmission uses the time_to_event field, the user device may acquire in advance information on when and how tiles corresponding to the event will be transmitted and thus obtain in advance tiles indicated by events before the events are generated.

For example, when an event of time_to_event=2 is transmitted at a time t based on event-based tile transmission, the user device may display a popup for asking the user about receiving a tile in advance to not miss the tile related to the event or automatically determining to receive the tile in advance to not be late to render the event, or when the tile for the event has already been transmitted, providing the user with a (visual, acoustic, or the like) notification to inform the user of the generation of the corresponding event when the corresponding event is generated in the near future.

Although the multi-viewport, POI, ROI, and event-based tile transmission are described individually as interest metadata based on the interest_metadata field, tile transmission based on two or more metadata selected therefrom is possible.

Interest Metadata-Based View/Playback:

A VR device performs interest metadata-based view/playback using interest metadata. The interest metadata-based view/playback may be performed when full VR video content data can already be used or when only a partial section of video content data having guided regions is received like in interest metadata-based tile transmission.

Multi-viewport interest metadata specifies an accurate position, size, and ID of each viewport available within content. The VR device may select a certain viewport ID (viewport_id) and display the corresponding viewport.

POI and ROI metadata-based views may exist for the same VR content (that is, 3 DOF 360 degree content), accordingly the POI and ROI metadata-based views are described together hereinafter.

POI and ROI metadata may be used in various methods to guide the VR view. Particularly, for a guided view of VR content on a VR device such as a TV, users may use POI and ROI metadata to easily select a viewport customized for a TV screen.

During playback of the VR content, the VR device may receive guided or restricted playback or full playback (user manual control for a viewport of the 3 DOF content) to select a viewport to be displayed. For the guided or restricted playback, the VR device may follow POI metadata or ROI metadata. Further, for the full playback, the VR device may or may not receive a guide instruction from the POI/ROI metadata.

Figure 14:
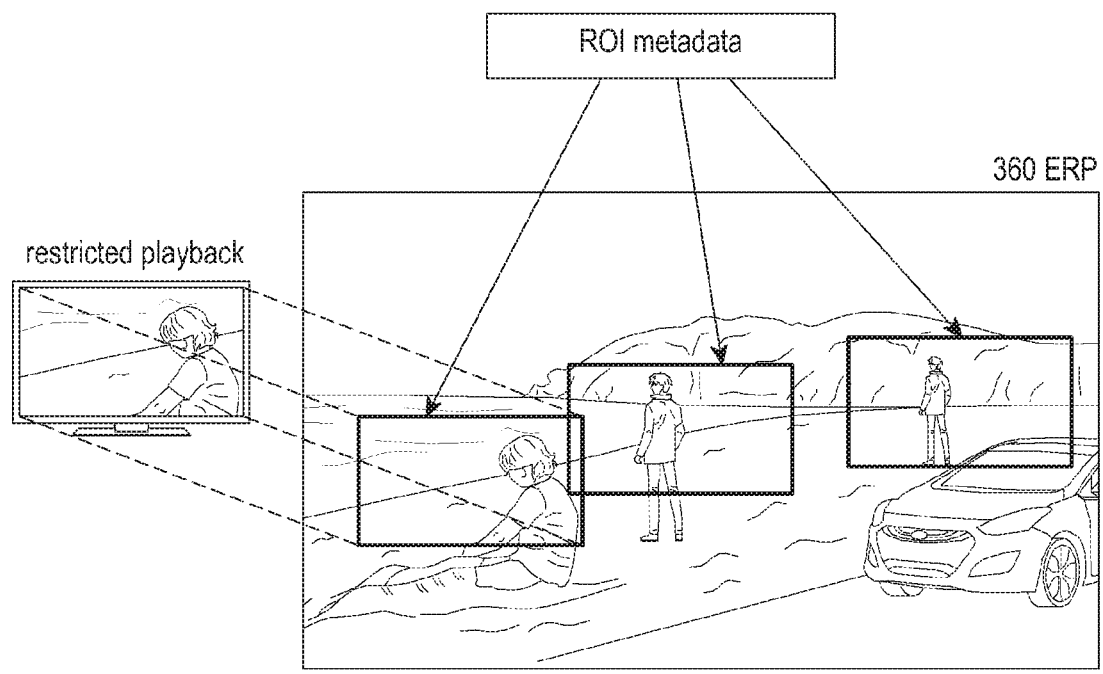
FIG. 14 illustrates an ROI metadata-based view.

FIG. 14 illustrates an ROI metadata-based view, that is, restricted playback of 3 DOF 360 degree content having ROI metadata on a device (for example, a TV) having no motion capability.

Referring to FIG. 14, three different ROIs are specified by interest metadata in a particular frame, and a VR device restrictively reproduces only a viewport corresponding to one of the ROIs.

When the POI metadata is followed for restricted playback, the POI metadata specifies only one point in the viewport, and thus the VR device may display the viewport based on the POI metadata by using FOV fields within the metadata. For example, the viewport to be displayed may be calculated using a device or content FOV metadata (device screen_fov or content_fov).

When the ROI metadata is followed for restricted playback, regions specified by the ROI metadata may be less than, similar to, equal to, or greater than an FOV viewport of the device, and thus an accurate viewport viewed to the user by the device may be determined according to one of the sizes of regions specified by the ROI metadata, convent_fov, and device screen_fov. For example, FOV compensation for rendering may be required according to a difference between device screen_fov and content_fov.

As described above, in the ROI metadata-based guided playback and other cases, the accurate viewport to be rendered and displayed may vary depending on device screen_fov and content_fov fields. Further, playback operations using the ROI metadata may vary depending on the size of regions specified by the ROI metadata.

The ROI metadata specifies an accurate region within a VR content video corresponding to operations generated in a predetermined region or content-specific objects. The region size of ROIs may be greater than that of average viewport/device FOVs, similar to that of the device FOV, or less than that of average viewport/device FOVs.

When the ROI metadata is greater or less than the average viewport/device FOVs, a viewport specified by device screen_fov or content_fov is displayed based on the ROI metadata. When the ROI metadata is similar to device FOVs and there are a plurality of ROI metadata for several FOVs, interest_metadata having the closest FOV to the device is first selected. To this end, the VR device identifies device screen_fov and selects corresponding interest metadata having a content_fov field that matches the identified device screen_fov. When there is no interest metadata having content_fov that exactly matches, the VR device selects interest metadata having the next largest FOV. For example, in a case of device screen_fov=95, the VR device selects corresponding interest metadata when content_fov=95 exists, and selects the next available field among fields corresponding content_fov>95 when content_fov=95 does not exist. That is, a condition for corresponding selection of interest_metadata is screen_fov=<content_fov.

According to such a procedure, when the closest ROI metadata to the FOV of the user device screen is selected, FOV compensation as illustrated in Table 15 below is needed if the corresponding ROI metadata is available.

TABLE 15

| FOV | Content | | |
|---|---|---|---|
| | Zoom in/out | Expanded view | Cut view |
| Device = content | N/A | N/A | N/A |
| Device > content | Zoom in | Show expanded view | N/A |
| Device < content | Zoom out | N/A | Show cut view |

Referring to Table 15 above, when device screen_fov=content_fov, a region specified by ROI metadata is directly displayed on the device screen. When device screen_fov>content_fov, the device should enlarge content to fit the ROI to screen_fov or show content of a region wider than specified by the ROI. When device screen_fov<content_fov, the device should reduce content to fit the ROI to screen_fov or show content of a region narrower than specified by the ROI.

In addition, event interest metadata is generally used for a particular "follow event" view (such as "follow POI"). Instead, (through a time_to_event field) event interest metadata may be used to trigger notifications for events occurring in the future. This is similar to POI notification-based view described below even though the device can provide a notification to the user in advance through events.

When automated POI/ROI tracking (follow POI/ROI) cannot be used or is not desired, the device may provide a POI/ROI notification/notice announcement to the user and guide a user's viewpoint for POI or ROI metadata-based view. POI/ROI notice/notification may include a popup notification for indicating a position and a direction of the POI/ROI which is not in the user's current viewport, a rim-based light notification (for example, edges of light surrounding a head-mounted display or a TV that are partially turned on to indicate a position of the POI/ROI outside the current viewport), vibration feedback (for example, multi-direction and multi-intensity vibration through a feedback device for indicating a position and "closeness" of the POI/ROI), or a sound-based notification (for example, a 3D sound, which matches the current viewport, having a notification sound from a direction of the POI/ROI). Vibration intensity may be controlled to match a distance of the POR/ROI from the user's current viewport.

In some cases, a predetermined content may include multi-type interest metadata (combination of POI, ROI, and events). In this case, interest metadata tracks or playback lists may be made to generate a chain of POI/ROI/event metadata according to a play time of the content. The interest metadata tracks or playback lists may be used for an automatic notification during restricted playback (follow interest metadata) or full playback.

In a user's viewpoint, playback of a VR content having POI and ROI metadata on a VR device (for example, a TV) may immediately control a viewport by selecting a predefined (content producers or other users, or provided by ready-made tracks) interest metadata track or playback list by the user, selecting to track a certain POI or ROI having the same ID at a given time point through a display device, or performing user manual control on a viewport according to whether the existence or non-existence of a guide instruction from the POI/ROI metadata.

Interest metadata tracks or playback lists may be made by a combination of individual POIs or ROIs of each frame, some of other interest metadata playback lists, and user-manually controlled viewport data (for example, personalized ROIs).

FIG. 15 illustrates an interest metadata track including individual POIs and ROIs for each frame.

Referring to FIG. 15, while POIs or ROIs having the same ID are specified for each frame (movement between regions according to time is acceptable), the interest metadata track is accepted to include POI and/or ROI metadata having different IDs according to time. The interest metadata track may include viewports from a plurality of cameras during a path of the track.

In addition, in the restricted playback, a change between different frames is not limited to panning and a sudden change to a different ROI or POI may be implemented in playback according to the ROI/POI. Influence depending on the change is similar to a scene change. The use of a scene change such as an ROI change is important to devices using an inconvenient input for controlling a rotation or devices having a small FOV such as TVs. This is because fast or random panning for a 360 degree video may cause users to feel dizzy.

FIG. 16 illustrates an example for performing restricted playback by using different ROI tracks for interest metadata views from the same 360 degree VR content.

Referring to FIG. 16, TV1 and TV2 may use ROI and POI metadata in order to acquire different viewports (Views 1, 2, and 3) and thus the same VR content that is reproduced in different devices uses different interest metadata tracks. Accordingly, the user may have different VR experiences according to the devices with respect to the same VR content.

In addition, for future VR content, a plurality of 360 degree VR cameras may be used to capture some scenes or sports games. In this case, in order to simultaneously support VR content on a plurality of devices in the user's side, it is possible to synchronize POI metadata between a plurality of cameras. The TV may display automatically guided VR experience through an interest metadata view for the same content. At the same time, the user may select a POI in the same scene for POI tracking from different cameras on a separate device (mobile device or the like).

FIGS. 17A, 17B, 17C, and 17D illustrate an example in which POI metadata supports multi-view and camera application.

Figure 17A:
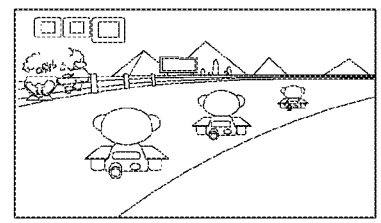
FIGS. 17A, 17B, 17C, and 17D illustrate an example in which POI metadata supports a multi-view and camera application.
Figure 17B:
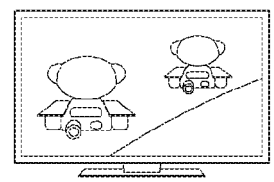
Figure 17C:
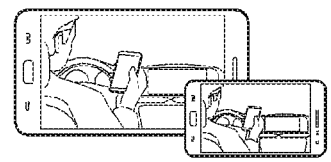
Figure 17D:
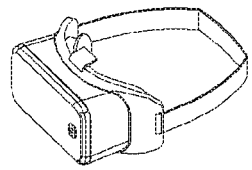

Referring to FIGS. 17A, 17B, 17C, and 17D, the user may track POIs of sports cars through using different cameras by synchronizing POI IDs as illustrated in FIG. 17B, and experience 360 degree VR according to the POIs from a driver's viewpoint on a mobile device as illustrated in FIG. 17C. Further, in order to provide shared VR experience to a plurality of users, the users may share their own POIs with other users.

When two or more users or all users use HMDs, the users cannot physically view corresponding users' screens or any type of body gesture, and accordingly, immediate POI sharing is useful.

Figure 18:
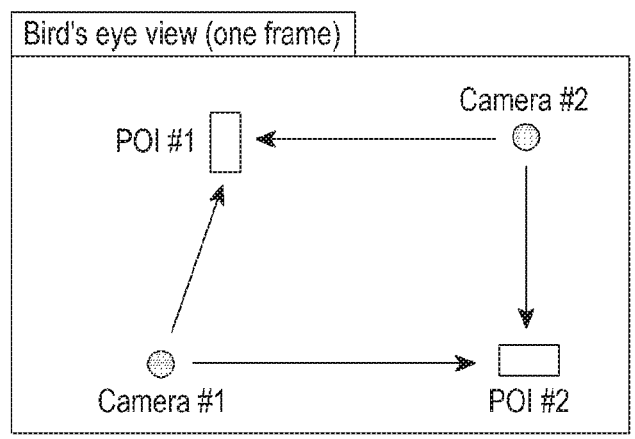
FIG. 18 illustrates an example of synchronizing POI identifiers (IDs) between a plurality of VR 360 degree cameras within the same screen.

FIG. 18 illustrates an example of synchronizing POI IDs between a plurality of 360 degree cameras within the same screen. In FIG. 18, an example of synchronizing POI IDs for the same POI between two VR 360 degree cameras is illustrated.

Referring to FIG. 18, interest metadata may be used for arranging VR subtitles based on ROI and/or POI. According to the present disclosure, when the ROI size aims at a device screen FOV, the subtitles may be displayed through ROI tracking. For example, the subtitles may always be displayed at a lower part of the screen regardless of a viewport. Alternatively, the subtitles may be displayed next to POIs through POI tracking. Thus, the device provides full playback or restricted playback. When two POIs correspond to characters talking to each other, subtitled dialog of each character may be displayed below (or next to) each character. When the POI-based subtitle arrangement is provided in full playback, the viewport should face the POI in order to allow the user to view the subtitles.

Further, through the use of interest metadata according to the present disclosure, correct 3D audio data may be mapped to regions within a corresponding VR content frame based on audio of view (AOV). Audio channels or audio objects may be mapped to particular regions within the frame. Correct audio channels or a combination thereof may be accurately presented to the user according to a viewport. AOVs may be based on ROIs in which the audio channel follows a predetermined ROI ID or based on POIs in which a particular audio entity corresponds to a particular POI.

Further, ROI/POI metadata according to the present disclosure may be used for view-dependent processing. A high quality 360 degree video may require significantly high processing complexity compared to old content in theory, and especially more processing is required when the ROI should match current content picture qualities (UHD, HDR, and the like) in a given time. For this reason and other various reasons, POV and POI metadata may be used for determination during view-dependent processing, and the view-dependent processing is performed only in current ROIs (or viewport regions surrounding the POI). The view-dependent processing may include supporting of view-dependent processing such as view-dependent ROI/POI content transmission, view-dependent ROI/POI decoding and rendering, view-dependent ROI/POI tone mapping, and view-dependent ROI/POI tile buffer selection.

Further, the 360 degree VR metadata according to the present disclosure accepts interaction possibility within the content. As an example of the interaction, there is playback of option screens (for example, scenes of a director's cut) included in the content that can be viewed only when predetermined events are triggered by the user while the content is watched. The interaction is unique for the VR content, and ROI and POI metadata may be used for triggering such type of interaction events. For example, a basic interaction event may correspond to switching a currently reproduced track to a separate screen or another screen when a user's current viewport includes a predetermined POI or ROI for a predetermined number of frames or more, which may be called a POI of a POI-triggered operation or a viewport-triggered operation.

In addition, when one frame includes a plurality of ROI and POI metadata or when one content includes a plurality of interest metadata tracks, ROI/POI metadata may include data that assigns priorities or ranks to different interest metadata according to a manufacture's creative intention. For example, when the user does not know which interest metadata should be selected, a TV device may automatically select interest metadata based on priority/rank data from the interest metadata within the frame.

Figure 19:
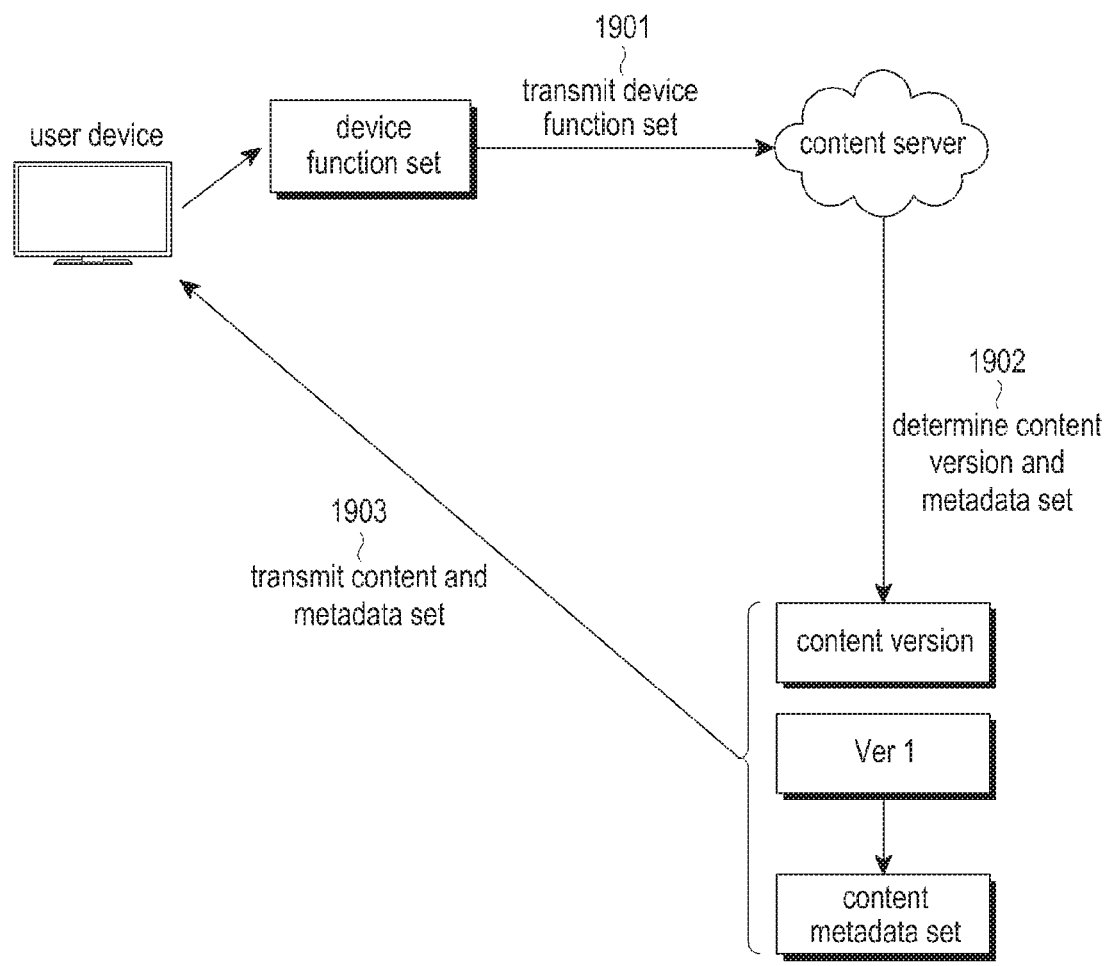
FIG. 19 illustrates a method of determining a metadata set according to the present disclosure.

FIG. 19 illustrates a method of determining a metadata set according to the present disclosure, and shows a case where a content server selects and transmits a proper version content and a content metadata set according in a push type.

Referring to FIG. 19, a user device transmits a device function set parameter to a content server in step 1901, and the content server determines a content version and a metadata set that match the device function set parameter in step 1902 and transmits the determined version content and metadata set to the user device in step 1903.

Figure 20:
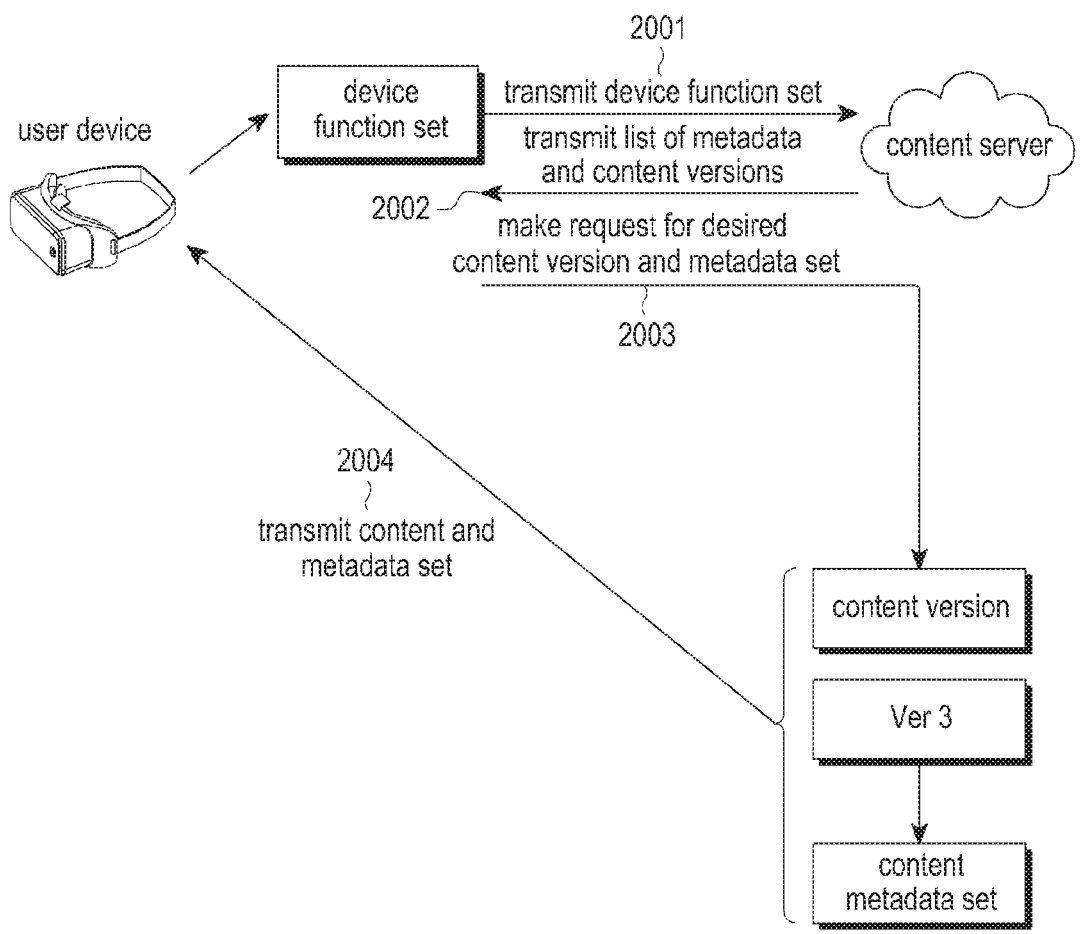
FIG. 20 illustrates a method of determining a metadata set according to the present disclosure.

FIG. 20 illustrates a method of determining a metadata set according to the present disclosure, and shows a case where a content server transmits a content version and a content metadata set after a negotiation with a user device in a search/pull type.

Referring to FIG. 20, the user device transmits a device function set parameter to the content server in step 2001, and the content server transmits a list of content versions and metadata sets that match the device function set parameter to the user device in step 2002. Then, the user device selects a particular version content and metadata set from the list and makes a request for them to the content server in step 2003, and the content server transmits the requested version content and metadata set to the user device in step 2004.

Figure 21:
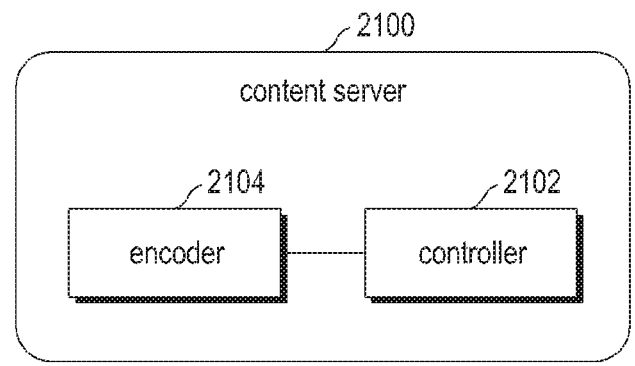
FIG. 21 is a block diagram of a content server according to the present disclosure.

FIG. 21 is a block diagram of a content server 2100 according to the present disclosure.

Referring to FIG. 21, the content server 2100 may include at least one of a controller 2102 and an encoder 2104. The content server 2100 may provide, for example, a 360 degree image of VR content. The encoder 2104 may image-stitch image data captured by a camera, encode a planarized 360 degree image, and encapsulate the image in a file form. The controller 2102 may control the operation of the encoder 2104. Further, according to the present disclosure, the controller 2102 may control a series of operations for recognizing, selecting, authenticating, and transmitting content of a version that matches each VR device based on metadata. The controller 2102 and the encoder 2104 do not necessarily have to be implemented as separate devices, but may be implemented as one module such as a single integrated circuit or chip.

Figure 22:
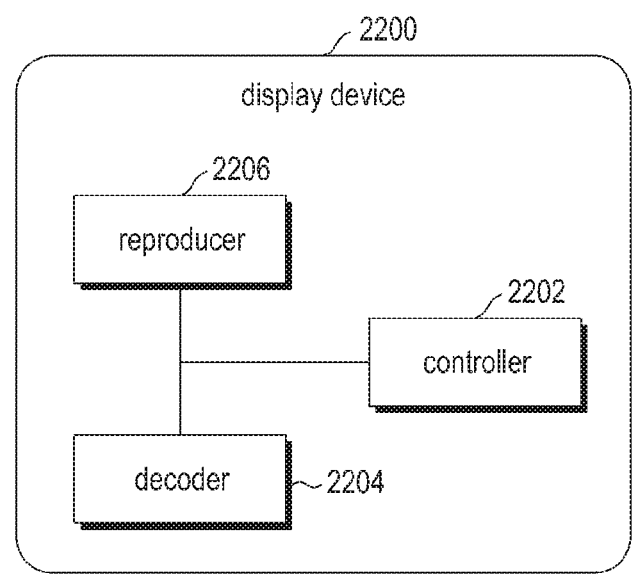
FIG. 22 is a block diagram of a user device according to the present disclosure.

FIG. 22 is a block diagram of a user device 2200 according to the present disclosure.

Referring to FIG. 22, the user device (i.e., a display device) 2200 may include at least one of a controller 2202, a reproducer 2206, and a decoder 2204. The user device 2200 may optimally display a transmitted 360 degree image based on interest metadata. The decoder 2204 may de-encapsulate and decode the transmitted 360 degree image that has been encapsulated in a file form and transmit the image to the user device 2200. The controller 2202 may control a series of operations of the reproducer 2206 and the decoder 2204. Further, the controller 2202 may control a series of operations for reproducing content of a version that matches the user device 2200 based on the defined metadata according to the present disclosure.

Figure 23:
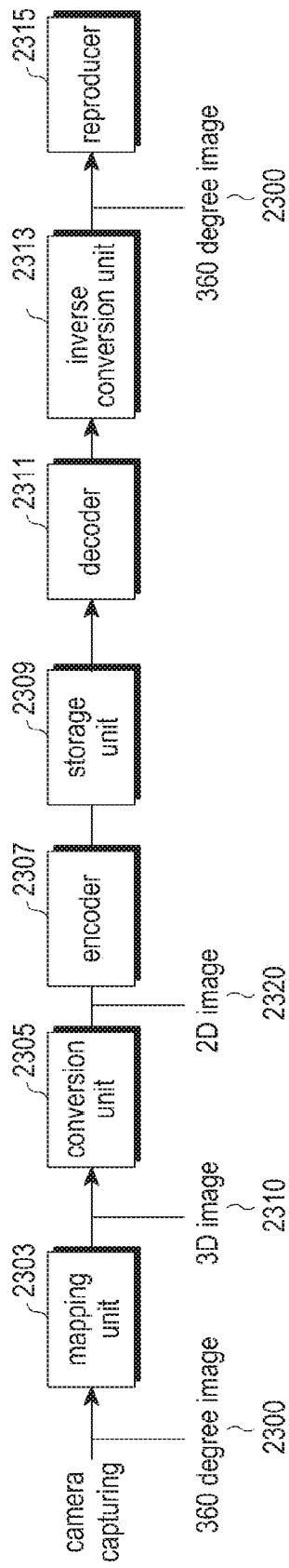
FIG. 23 is a block diagram of a system for processing a 360 degree content according to the present disclosure.

FIG. 23 is a block diagram of a system for processing a 360 degree content according to the present disclosure.

Referring to FIG. 23, the system includes a mapping unit 2303, a conversion unit 2305, an encoder 2307, a storage unit 2309, a decoder 2311, an inverse conversion unit 2313, and a reproducer 2315.

A 360 degree image 2300 captured by several cameras is input into the mapping unit 2303, and the mapping unit 2303 maps the 360 degree image 2300 to a 3D model, for example, the surface of a sphere to generate and output a 3D image 2310.

The 3D image 2310 is input into the conversion unit 2305, and the conversion unit 2305 image-stitches the input 3D image 2310 to convert the 3D image 2310 into a 2D image 2320 and outputs the 2D image 2320. The 2D image 2320 is input into the encoder 2307, and the encoder 2307 encodes the input 2D image 2320 in a predetermined encoding scheme and encapsulates and outputs the image in a file form. The encoded 2D image may be stored in the storage unit 2309.

The 2D image in the file form output from the storage unit 2309 is input into the decoder 2311, and the decoder 2311 de-encapsulates the input image and decodes and outputs the image in a predetermined decoding scheme. The decoded 2D image is input into the inverse conversion unit 2313, and the inverse conversion unit 2313 inversely converts the input 2D image into a 3D image and outputs the 3D image 2330.

The inversely converted 3D image 2330 is input into the reproducer 2315, and the reproducer 2315 displays the input image.

The conversion unit 2305 and the encoder 2307 may use metadata according to the present disclosure in a process of stitching the 3D image and converting the 3D image into the 2D image. Further, the decoder 2311, the inverse conversion unit 2313, and the reproducer 2315 may use metadata according to the present disclosure in a process of decoding and inversely reproducing the 2D image.

It should be noted that the method and the device configuration illustrated in FIGS. 2 to 23 is not intended to limit the scope of the present disclosure. That is, it should not be construed that all component parts or operations shown in FIGS. 2 and 23 are essential component elements for implementing the present disclosure, and it should be understood that only a few component elements may implement the present disclosure without departing from the scope of the present disclosure.

The above described operations may be implemented by providing a memory device storing corresponding program codes in any unit of a server or UE apparatus in a communication system. That is, the controller of the server or UE may perform the above described operations by reading and executing program code stored in a memory device by means of a processor or a central processing unit (CPU).

Various units, modules, and the like of the server or terminal apparatus may be operated using a hardware circuit, for example, a complementary metal oxide semiconductor-based logic circuit, firmware, software, and/or a combination of hardware and firmware and/or software embedded in a non-transitory computer readable storage medium. For example, various electronic configurations and methods may be implemented using electronic circuits such as transistors, logic gates, and application specific integrated circuits (ASICs).

While the present disclosure has been shown and described above with reference to certain embodiments thereof, it will be understood by those skilled in the art that various changes in form and details may be made therein without departing from the scope of the present disclosure. Therefore, the scope of the present disclosure is not limited to the embodiments of the present disclosure, but are defined by the appended claims and equivalents thereof.

What is claimed is:

1. A method of reproducing content by a user device in a virtual reality system, the method comprising:
   transmitting, to a content server, a plurality of parameters related to at least one function of the user device, wherein the plurality of parameters includes a first parameter indicating a degree of freedom (DOF) supported by the user device and a second parameter indicating an angle of a field of view (FOV) supported by a screen of the user device;
   receiving, from the content server, metadata of content which is transmitted by the content server based on the plurality of parameters, wherein the metadata includes at least one version of the content;
   receiving and decoding at least one tile among a plurality of tiles configuring the content based on the plurality of parameters, wherein the at least one tile corresponds to a view area to be displayed in accordance with a viewpoint; and
   rendering the decoded at least one tile based on the metadata.

2. The method of claim 1, wherein the plurality of parameters further comprises information on screen specification, a codec function, a function of a function for mapping a planar image to a 360 degree image, and a device function for supporting guided view metadata.

3. The method of claim 1, wherein the metadata includes metadata for selecting a version of the content and metadata for transmitting and reproducing the content.

4. The method of claim 3, wherein the metadata for selecting the version of the content includes at least one of metadata indicating the DOF, a resolution version of the content, and a partial decoding supported by the content, and metadata indicating a parameter related to mapping of the content to a planar image, and the metadata for transmitting and reproducing the content includes at least one of metadata related to a multi-viewport, a point of interest (POI), a region of interest (ROI), and an event.

5. The method of claim 1, wherein the receiving of the metadata comprises:
receiving a list of content versions of the content and interest metadata of the content from the content server;
selecting a content version and interest metadata from the list, and requesting content of the selected content version and the selected interest metadata to the content server; and
receiving the content of the selected content version and the selected interest metadata.

6. The method of claim 1, wherein the rendering of the decoded at least one tile comprises, when the FOV of the screen of the user device is different from an FOV of the content, performing the rendering by controlling the FOV of the content to match the FOV of the screen of the user device.

7. A user device for reproducing content in a virtual reality system, the user device comprising:
a communication interface; and
a controller coupled to the communication interface, wherein the controller is configured to:
transmit, to a content server a plurality of parameters related to at least one function of the user device, wherein the plurality of parameters includes a first parameter indicating a degree of freedom (DOF) supported by the user device and a second parameter indicating an angle of a field of view (FOV) ef-supported by a screen of the user device;
receive, from the content server, metadata of content which is transmitted by the content server based on the plurality of parameters, wherein the metadata includes at least one version of the content;
receive and decode at least one tile among a plurality of tiles configuring the content based on the plurality of parameters, wherein the at least one tile corresponds to a view area to be displayed in accordance with a viewpoint; and
render the decoded at least one tile based on the metadata.

8. The user device of claim 7, wherein the plurality of parameters further comprises information on screen specification, a codec function, a function of a function for mapping a planar image to a 360 degree image, and a device function for supporting guided view metadata.

9. The user device of claim 7, wherein the metadata includes metadata for selecting a version of the content and metadata for transmitting and reproducing the content.

10. The user device of claim 9, wherein the metadata includes at least one of metadata indicating the DOF, a resolution version of the content, and a partial decoding supported by the content, and metadata indicating a parameter related to mapping of the content to a planar image, and the metadata for transmitting and reproducing the content includes at least one of metadata related to a multi-viewport, a point of interest (POI), a region of interest (ROI), and an event.

11. The user device of claim 7, wherein the controller is configured to:
receive a list of content versions of the content and interest metadata of the content from the content server,
select a content version and interest metadata from the list,
request content of the selected content version and the selected interest metadata to the content server, and
receive the content of the selected content version and the selected interest metadata.

12. The user device of claim 7, wherein, when the FOV of the screen of the user device is different from an FOV of the content, the controller is configured to render the at least one decoded tile by controlling the FOV of the content to match the FOV of the screen of the user device.

13. A method for transmitting content by a content server in a virtual reality system, the method comprising:
receiving a plurality of parameters related to at least one function of a user device, wherein the plurality of parameters includes a first parameter indicating a degree of freedom (DOF) supported by the user device and a second parameter indicating an angle of a field of view (FOV) supported by a screen of the user device;
transmitting, to the user device, metadata of content based on the received plurality of parameters, wherein the metadata includes at least one version of the content; and
encoding and transmitting at least one tile among a plurality of tiles configuring the content based on the plurality of parameters, wherein the at least one tile corresponds to a view area to be displayed in accordance with a viewpoint.

14. The method of claim 13, wherein the plurality of parameters further comprises information onscreen specification, a codec function, a function of a function for mapping a planar image to a 360 degree image, and a device function for supporting guided view metadata.

15. The method of claim 13, wherein the metadata includes metadata for selecting a version of the content and metadata for transmitting and reproducing the content.

16. The method of claim 15, wherein the metadata for selecting the version of the content includes at least one of metadata indicating the DOF, a resolution version of the content, and a partial decoding supported by the content, and metadata indicating a parameter related to mapping of the content to a planar image, and the metadata for transmitting and reproducing the content includes at least one of metadata related to a multi-viewport, a point of interest (POI), a region of interest (ROI), and an event.

17. The method of claim 13, wherein the transmitting of the metadata comprises:
transmitting a list of content versions of the content and interest metadata of the content to the user device;
in response to a content version and interest metadata being selected by the user device, receiving, from the user device, a request for content of the selected content version and the selected interest metadata from the list; and
transmitting the content of the selected content version and the selected interest metadata.

18. A content server for transmitting content in a virtual reality system, the content server comprising:
a communication interface; and
a controller coupled to the communication interface, wherein the controller is configured to:
receive a plurality of parameters related to at least one function of a user device, wherein the plurality of parameters includes a first parameter indicating a degree of freedom (DOF) supported by the user device and a second parameter indicating an angle of a field of view (FOV) supported by a screen of the user device;
transmit, to the user device, metadata of content based on the received plurality of parameters, wherein the metadata includes at least one version of the content; and
encode and transmit at least one tile among a plurality of tiles configuring the content based on the plurality of parameters, wherein the at least one tile corresponds to a view area to be displayed in accordance with a viewpoint.

19. The content server of claim 18, wherein the plurality of parameters further comprises information on screen specification, a codec function, a function of a function for mapping a planar image to a 360 degree image, and a device function for supporting guided view metadata,
the metadata related to the content includes metadata for selecting a version of the content and metadata for transmitting and reproducing the content,
the metadata for selecting the version of the content includes at least one of metadata indicating the DOF, a resolution version of the content, and a partial decoding supported by the content, and metadata indicating a parameter related to mapping of the content to a planar image,
and the metadata for transmitting and reproducing the content includes at least one of metadata related to a multi-viewport, a point of interest (POI), a region of interest (ROI), and an event.

20. The content server of claim 18, wherein the controller is further configured to:
transmit a list of content versions of the content and interest metadata of the content to the user device,
in response to a content version and interest metadata being selected by the user device, receive, from the user device, a request for content of the selected content version and the selected interest metadata from the list, and
transmit the content of the selected content version and the selected interest metadata.

* * * * *